Sept. 1, 1964 V. BUSH 3,146,765
FREE PISTON ENGINE
Original Filed Jan. 25, 1955 5 Sheets-Sheet 1
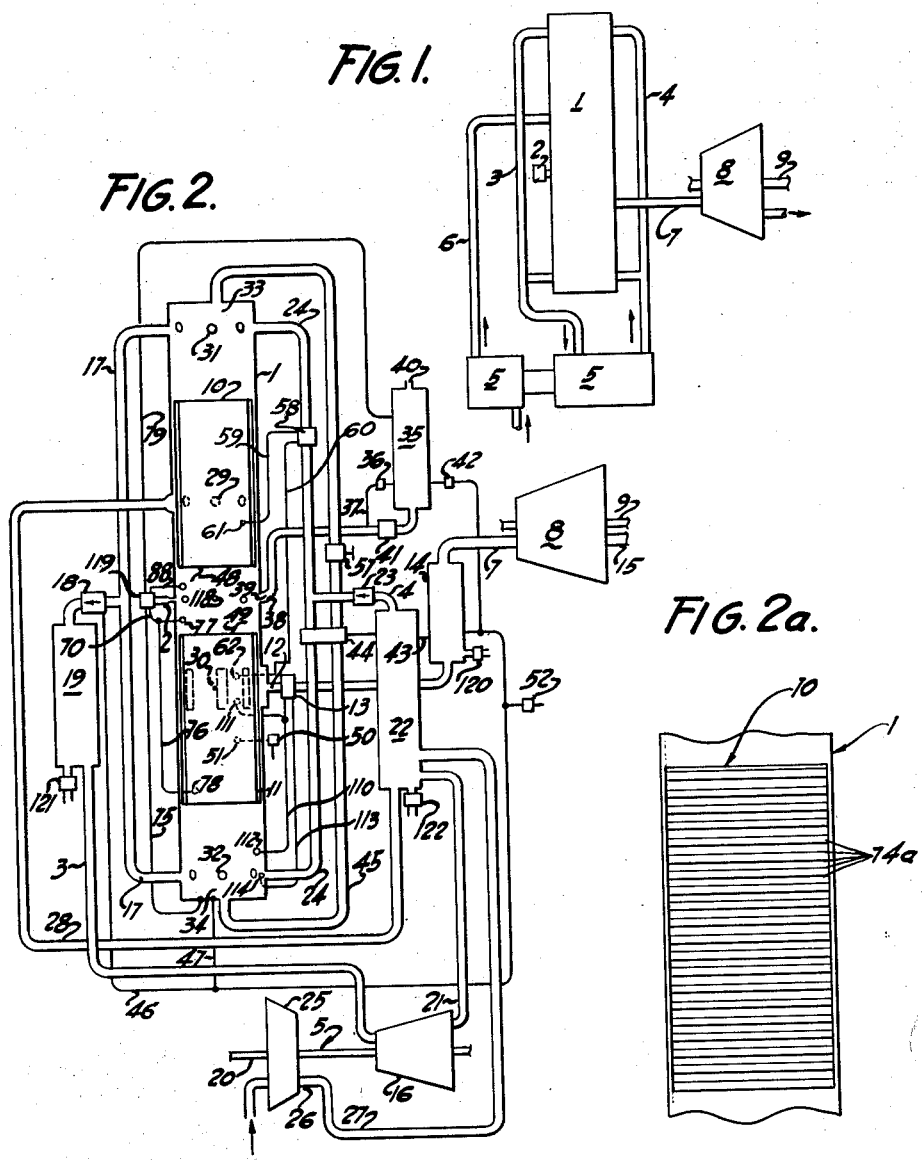
INVENTOR
Vannevar Bush
By A. G. Downes.
Attorney Sept. 1, 1964 V. BUSH 3,146,765
FREE PISTON ENGINE
Original Filed Jan. 25, 1955 5 Sheets-Sheet 2
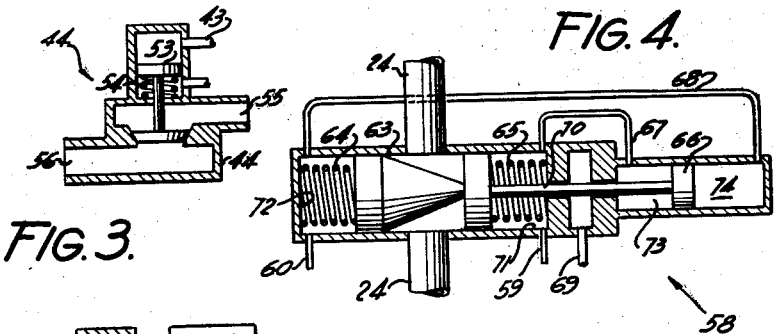
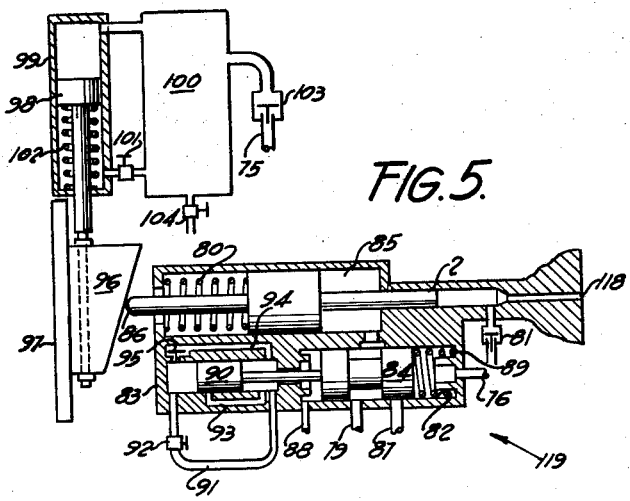
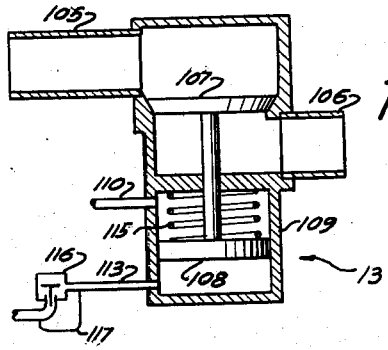
INVENTOR
Vannevar Bush
By *A. G. Downs*
Attorney Sept. 1, 1964 V. BUSH 3,146,765
FREE PISTON ENGINE
Original Filed Jan. 25, 1955 5 Sheets-Sheet 3
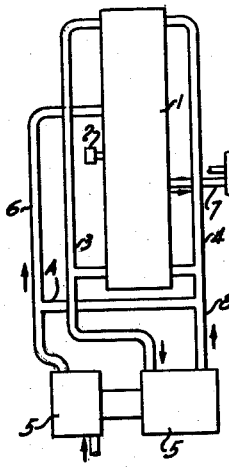
FIG. 7
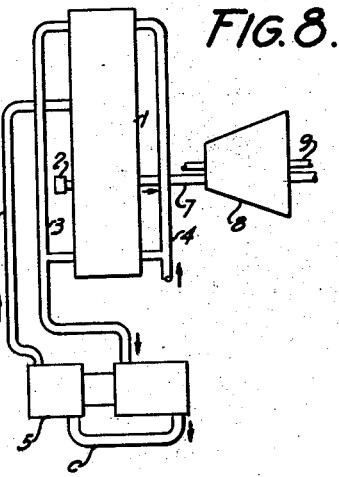
FIG. 8
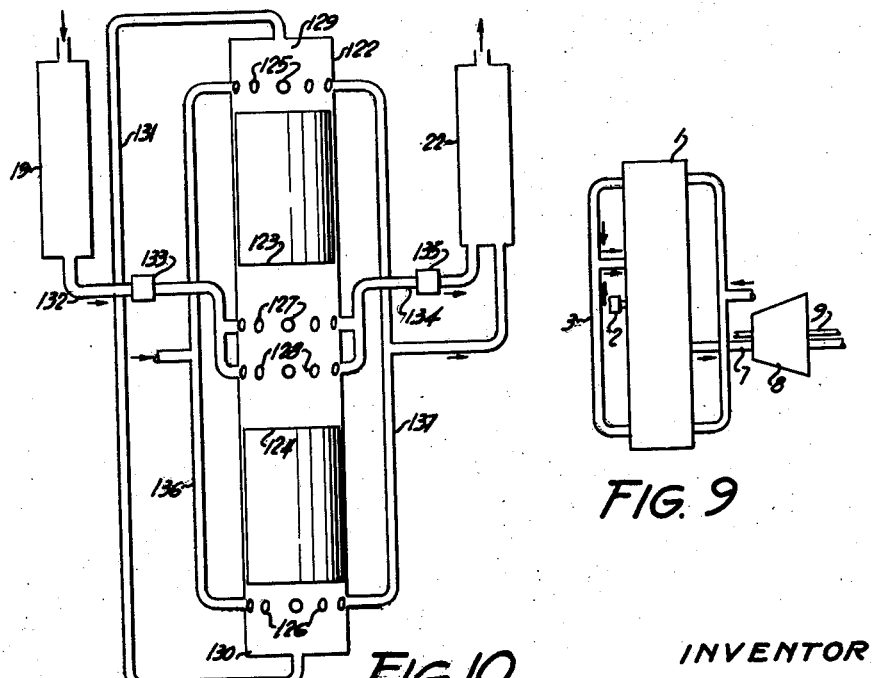
FIG. 10
FIG. 9
INVENTOR
Vannevar Bush
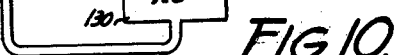
Attorney

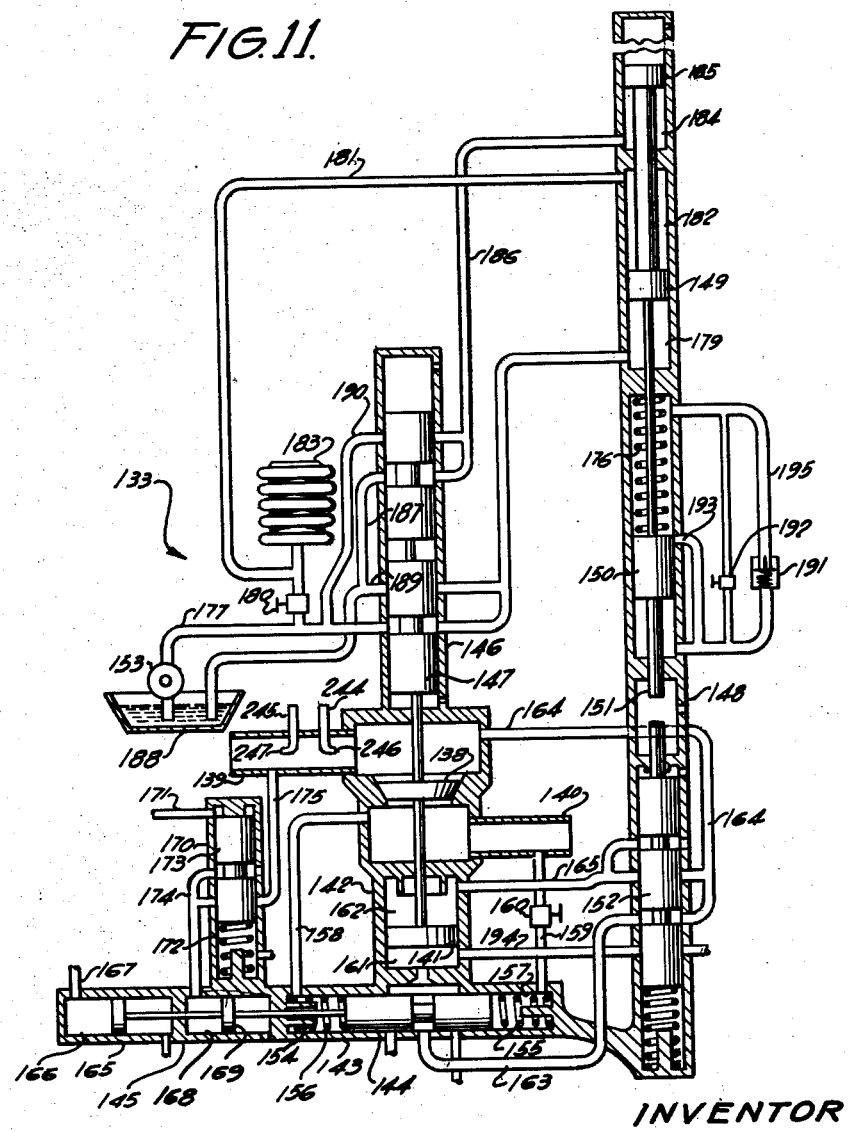

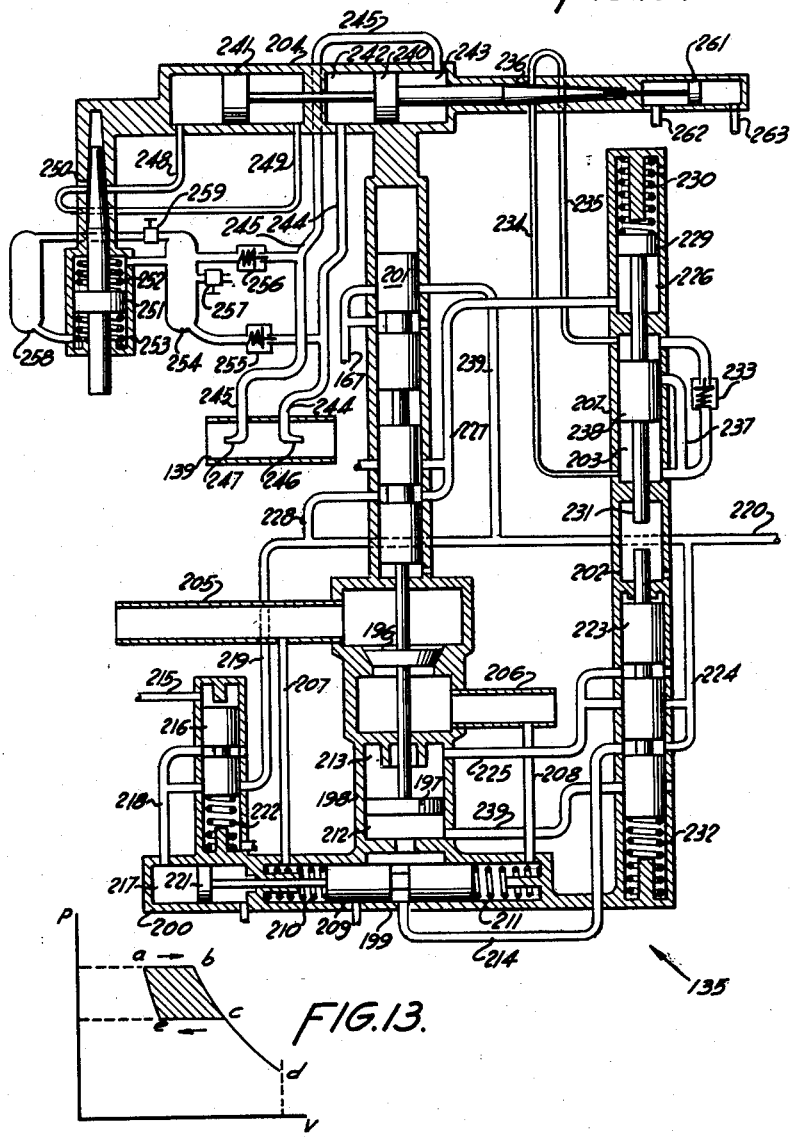

United States Patent Office 3,146,765
Patented Sept. 1, 1964

3,146,765
FREE PISTON ENGINE
Vannevar Bush, Jaffrey, N.H.
Original application Jan. 25, 1955, Ser. No. 483,987, now
Patent No. 2,983,098, dated May 9, 1961. Divided
and this application Feb. 10, 1961, Ser. No. 88,495
20 Claims. (Cl. 123—46)

This is a division of application Serial No. 483,987, filed January 25, 1955, now Patent 2,983,098 granted May 9, 1961.

My invention relates generally to internal combustion engines, in which fuel is burned internally at a relatively high temperature and useful mechanical work is derived from the expansion of hot gases in a mechanism in which such expansion is caused to rotate a shaft. It also relates to internal combustion engines in which the compression is high and in which the consequent high temperature results in automatic ignition of injected fuel. It also relates to the class of such engines in which expansion of gas in a turbine is employed to produce useful work.

The simplest engine of the class is the gas turbine. It consists essentially of a turbo-compressor for compressing air, a heating chamber in which fuel is burned, and a turbo-expander which drives the turbo-compressor and also delivers useful work. The efficiency of any heat engine depends primarily upon the range of temperature which it employs, and thus upon the maximum temperature which can be utilized and at which the heat input occurs. The efficiency attainable in the gas turbine is severely limited by the fact that the maximum temperature which can be utilized is that to which turbine blades may be safely and continuously subjected.

The diesel engine is of the class considered, except that expanding gas acts indirectly on the shaft through pistons and cranks, instead of by expansion in a turbine. The ratio of compression which can be used in such an engine is severely limited by mechanical considerations. It involves complicated and expensive construction. However, the maximum temperature which can be employed intermittently in a cylinder is greater than can practically be applied continuously to turbine blades.

In attempts to overcome the limitations of preceding engines, so-called free piston engines have been constructed and described in the literature. Their essential features are as follows: A cylinder contains two pistons which can oscillate. Each piston has parts of two different diameters, working in portions of the cylinder of corresponding diameters. The pistons are constrained to move in synchronism by the use of appropriate means, such as rods and gears, so that they approach and recede from the center of the cylinder in unison. Between the pistons, in the portion of the cylinder of small diameter, there is a varying volume which acts in the manner of the cylinder volume of a diesel engine. Air is there admitted and compressed, fuel is injected and burned, and expansion occurs driving the pistons apart. The outer ends of the pistons, in the portion of the cylinder of larger diameter, operate in conjunction with valves to take in atmospheric air and compress it moderately to supercharge the central volume. The exhaust from the central volume, at a pressure not much less than the supercharging pressure, but at a much higher temperature, is expanded in a turbine to produce useful work. It will be noted that the burning of fuel in the central volume provides the power for compression in the end volumes, and also provides hot gas at elevated pressure to drive the turbine.

Engines of this sort have certain notable advantages. The temperature of fuel input may be high, rendering high efficiency possible, although the turbine blades operate at a temperature which is readily sustained by high temperature metal alloys. The complex system of connecting rods and cranks of the diesel engine is not used, and compression may be made high in the absence of this limitation. But there are also disadvantages. The dual diameter and cylinder construction is expensive and difficult to hold in line when hot. The synchronizing mechanism is cumbersome. Lubrication and piston ring construction give difficulty.

It is therefore the main object of the invention to overcome limitations inherent in existing forms of engines of this general class, and by so doing to provide a reliable engine of exceptionally high efficiency.

It is another object of this invention to improve upon free piston engines as at present constructed, while retaining their advantages.

It is another object of the present invention to overcome high temperature limitations, while at the same time preserving some of the desirable attributes of the gas turbine, and utilizing a mechanism which has important, novel and desirable features.

Another object of the present invention is to employ the intermittent high temperatures of the diesel engines; in fact, to exceed the limitations of such engines in employing them, while at the same time avoiding the limits inherent in the mechanical construction of such engines.

Other objects of the invention, together with the foregoing, are attained in the embodiments thereof described in the accompanying description and illustrated in the accompanying drawings, in which—

FIGURE 1 is a simplified diagrammatic representation of the major components of my free piston engine;

FIGURE 2 is a diagrammatic representation in greater detail and with parts in cross-section of a complete engine similar to that shown in FIGURE 1;

FIGURE 2a is a fragmentary enlarged view similar to a portion of FIGURE 2 and showing the circumferential grooves on the pistons;

FIGURE 3 is a diagrammatic detail in cross-section of an auxiliary poppet valve;

FIGURE 4 is a diagramatic detail in cross-section of a cylinder valve;

FIGURE 5 is a diagrammatic detail, largely in cross-section, of a control mechanism for fuel injection;

FIGURE 6 is a diagrammatic detail in cross-section showing an exhaust control valve;

FIGURE 7 is another diagrammatic representation, comparable to FIGURE 1, but showing somewhat different flow connections;

FIGURE 8 is a diagrammatic representation, similar to FIGURE 7, but showing the effective flow connections for starting;

FIGURE 9 is a diagrammatic representation similar to FIGURE 7, but showing flow connections for small loads;

FIGURE 10 is a diagrammatic representation in detail, and with parts in cross-section of an oscillatory pressure converter;

FIGURE 11 is a diagrammatic detail, mostly in cross-section, and having a special valve for the oscillatory pressure converter;

FIGURE 12 is a diagrammatic detail, mostly in cross-section, and having another special valve for the oscillatory pressure converter; and FIGURE 13 is a pressure volume diagram on rectangular coordinates of the cycle of my oscillatory pressure converter.

In one embodiment of the invention, there are provided pistons which are of simple cylindrical form, having a single diameter only, oscillating in a cylinder of uniform bore. Also provided are means for maintaining the oscillations of such pistons in synchronism, without the use of mechanical parts connected to the pistons. As such pistons experience no substantial side thrust, and involve no problems of alignment of parts, they may be made to maintain separation from the cylinder by means of a film of air, thus dispensing with lubrication by oil. In the absence of oil lubrication cylinder cooling may be greatly reduced or even dispensed with, thus improving efficiency and simplifying construction.

It is consequently the general object of the invention to produce an engine having high efficiency, long life, and high output per pound of weight, involving air lubricated reciprocating parts, and greatly reduced cooling means.

In the form of engine illustrated in FIGURE 1, there is shown a main oscillator 1. This comprises a cylinder of uniform bore containing two simple cylindrical pistons adapted to oscillate in synchronism. The central volume between the pistons acts in the manner of a supercharged diesel engine cylinder volume, and is supplied with fuel at the appropriate times by a fuel injector 2. The outer volumes between the pistons and the cylinder heads act together and are interconnected for this purpose by discharge and intake pipes 3 and 4, respectively. These end volumes act as air compressors and furnish energy to a pressure converter 5 through the pipe 3, the exhaust from the converter being returned through the pipe 4. The pressure converter output, in the form of air compressed to moderate pressure, is supplied through a pipe 6 to supercharge the central volume of the main oscillator 1. The exhaust from the central volume is delivered through a pipe 7 to an expansion turbine 8, which supplies power to an output shaft 9. There are reservoirs in the pipe lines to equalize flow, and there are valves and control means of various sorts, to be described.

The cycle in the central volume of the main oscillator 1 includes a compression stroke during which air is compressed to high pressure and temperature, a power stroke during which fuel is injected and burned, and an exhaust period at the end of the power stroke when ports are uncovered by the pistons and gas flows axially of the cylinder, to deliver gases to the turbine and introduce a charge of fresh air. During the stroke when the pistons are approaching, air is drawn into the outer volumes and during the return stroke the pistons compress this air and deliver it to the reservoir which supplies the pressure converter 5. The pressure converter 5 takes in energy of compressed air, in the form of a relatively small volume of air at high pressure difference, and delivers this energy to the main oscillator 1, for supercharging, in the form of a relatively large volume of air at a relatively low pressure. It will be noted that the pressure converter 5 performs an important function, and that its presence allows the use of a main oscillator 1 having a uniform bore.

The active volumes of the center, and of the ends of main oscillator 1 are not greatly different in magnitude. For full scavenging at full load the center volume needs to be substantially filled, each cycle, with air at elevated pressure. The end volumes can take in approximately this volume of air, each cycle, at atmospheric pressure, if their inlet is directly connected to atmosphere. But, after compression, this air will not have sufficient volume, by a substantial factor, for central scavenging. However, if, as indicated, the end volumes take in air at elevated pressure, they can compress and deliver it to the pressure converter 5, and, in so doing, deliver to this unit the full power necessary for supercharging, and for incidental losses, and the pressure converter 5 can thus utilize this power to deliver to the main oscillator 1 a sufficient volume of air for adequate scavenging and supercharging.

It will assist in explanation if the general magnitude of pressures and temperatures under typical full load conditions is indicated. The supercharging air may be at 75 pounds per square inch gage. If this supercharging air is compressed adiabatically from atmosphere at 15 pounds per square inch absolute, and 70° F., its temperature will be approximately 430° F. Its specific volume will be approximately .28 if the specific volume of atmospheric air is taken at unity. In the central volume the gas may be compressed at 2250 pounds per square inch absolute and its temperature will rise to approximately 1800° F. The injection of fuel, during the first part of the power stroke should be at such a rate as approximately to maintain this high temperature and cause isothermal expansion. Thereafter, during the remainder of the power stroke, expansion will be approximately adiabatic. The exhaust to the turbine 8 may then be at approximately 1200° F. and at a pressure a little lower than 75 pounds per square inch gage, allowing for frictional fall of pressure in passages. In the turbine, expansion occurs from this pressure to atmospheric and the temperature falls to approximately 530° F. The heat input is at 1800° F. and the heat sink at 530° F. Hence, the ideal thermodynamic efficiency is 56%. This, of course, is only approached in practice, due to inevitable losses. But it is a high limit.

The end volumes of the main oscillator may take in air at 75 pounds per square inch gage and 430° F., they may in fact draw it from the same reservoir as supplies scavenging air. They then take in approximately the same weight of air per cycle as is used for scavenging per cycle. The energy used in an adiabatic compression is proportional to the difference of temperature produced. Compressing air for scavenging occasioned a temperature rise of 360° F. The power delivered by the end volumes of the main oscillator is equal to the power used in supercharging, plus losses. Hence, in the end volumes the temperature rise will be somewhat more than 360° F. and the temperature of the air delivered to the pressure converter will be somewhat above 790° F. In the pressure converter it expands, in doing work, to its original condition, and the power developed is used to compress atmospheric air to the supercharging pressure. One can reduce the temperatures used in the pressure converter by cooling the intake reservoir, but the above temperatures are readily utilized. It is an aid to explanation also if the general magnitude of power in a unit is stated. A cubic foot of air at 75 pounds per square inch gage, expanding to atmospheric pressure adiabatically, produces ideally 13,000 foot pounds of energy. Thus, an oscillator 5 inches in diameter, with 8 inch stroke, operating at 3400 cycles per minute delivers to the turbine the equivalent of 100 horsepower. This should be multiplied by turbine efficiency to obtain shaft horsepower. The output of an engine of moderate size is thus substantial, and may be increased by raising the supercharging pressure.

The engine will now be described in detail. In this description, especial attention will be paid to certain critical points which are believed to involve important novelty. One such is a means for maintaining two pistons in a cylinder in synchronous oscillation, without mechanical connection of any sort to the pistons. Another is means by which such a piston may be made to ride upon a film of air, without undue gas leakage past the piston, thus obviating the need for oil lubrication and cooling of the cylinder. Another is means for offsetting the effect of gravity on the pistons, if, as is preferable, the cylinder is operated vertically. Another is means for timing operations automatically without connections to the pistons. Automatic means will be described for maintaining the amplitude of oscillation substantially constant. Starting means will be described. On the matter of controls, valve action, and the like various means may be employed without departing from the novel aspects of this invention, and the form now considered preferred will be described.

In FIG. 2 is shown a complete engine, with certain parts shown in block diagram only, and later to be described. The main oscillator cylinder 1 contains pistons 10 and 11. The discharge from the center volume of the cylinder 1 passes through exhaust ports 30, a conduit 12 and a valve 13 to a reservoir 14, which supplies the power turbine 8, which exhausts to atmosphere through a pipe 15. This produces output power on the shaft 9. Reservoirs are shown small for convenience, but are to be understood to be large enough to substantially smooth out fluctuations in flow when connected between reciprocating and rotary units. The pressure converter 5 consists of a turbo-motor unit and a turbo-compressor unit mounted on the same shaft. The unit 16 is a turbo-motor. It receives compressed air at relatively high pressure from the interconnected end volumes of the main oscillator through a conduit 17, a check valve 18, a reservoir 19, and the conduit 3. Preferably, there are reed check valves (not shown) in the branches of the conduit 17 adjacent the ports 31 and 32 to prevent back flow. The air from the end volumes expands in the turbine 16, delivering power to a shaft 20, and exhausting through a conduit 21 to a reservoir 22, which is at moderate pressure during full load operation. The interconnected ends of the main oscillator draw air from the reservoir 22 through the conduit 4, a check valve 23, and a conduit 24. Thus, the end volumes of the oscillator act as air compressors in a closed circuit to supply power to the turbine 16. Special considerations regarding the operation of valves in this circuit will be considered later. The unit 25 of the pressure converter 5 is a turbo-compressor driven by the shaft 20. It draws air from the atmosphere through a conduit 26 and delivers it at moderate pressure to the reservoir 22 through a conduit 27. The reservoir 22 delivers air through a conduit 28 to input ports 29 of the main oscillator. This air, on exhaust, passes through exhaust ports 30 and the conduit 7 to the power turbine 8, as has been described. The fuel injector 2, controlled by a mechanism 119, delivers fuel through nozzles 118 as will be described.

The primary functioning is as follows. The pistons 10 and 11 oscillate in synchronism, that is they approach and recede from the center of the cylinder in unison. Consider their operation beginning at the time of closest approach, that is at the beginning of the power stroke. At this time, the volume between them contains highly compressed air at high temperature. This high pressure rapidly accelerates the pistons and they separate. As they do so fuel is injected through nozzles or orifices 118 and burns, maintaining temperature and causing a substantially isothermal expansion. After an interval the fuel injection is cut off by control mechanism and expansion continues adiabatically. Toward the end of the power stroke the lower piston uncovers long exhaust ports 30, but the valve 13 remains closed and the expansion continues. At the end of the stroke the valve 13 opens. At this time, the inlet ports 29 have been uncovered by the upper piston 10. Air then flows from the reservoir 22, which is at a slightly higher pressure than the reservoir 14, through the conduit 28, the ports 29, axially through the central volume of the oscillator, out through the ports 30, through the conduit 12 and the valve 13, to the reservoir 14, thus supplying air for the operation of the turbine 8 at a moderate pressure and elevated temperature, and filling the central volume of the oscillator with fresh air at the pressure of supercharging.

During this power stroke the action in the end volumes of the oscillator is as follows. At the beginning of the stroke these volumes are filled with air substantially at the pressure of the reservoir 22. During the first part of the stroke this air is compressed adiabatically until it reaches a pressure slightly above that of the reservoir 19. Exhaust of the compressed air then occurs through the ports 31 and 32, the conduit 17, and the check valve 18, to the reservoir 19. This continues until the ports 31 and 32 are covered by the pistons. At this time not all of the kinetic energy imparted to the pistons by the power stroke in the central volume has been absorbed by the work done in compressing air in the end volumes. The pistons hence continue their stroke and compress air to high pressure in the buffer volumes 33 and 34. These volumes are interconnected, for reasons that will be described, but are otherwise substantially closed. They hence act as powerful springs to reverse the direction of motion of the pistons. In other words, the pistons bounce after impacting on the air buffers. The return stroke then begins.

During the return stroke, in the center volume, exhaust continues as described until the ports 30 are covered by the piston 11. Thereafter for the remainder of this stroke the entrapped air is compressed and rises to high pressure and high temperature, thus completing the cycle of the center volume. During the return stroke, in the end volumes, the compressed air expands adiabatically until its pressure drops to slightly below that of the reservoir 22. Thereafter for the remainder of the stroke air enters from the reservoir 22 through the conduit 4, the check valve 23, the conduit 24, and the ports 31 and 32, thus completing the cycle of the end volumes. This completes the functioning of the main cycles. Various auxiliary functioning remains to be described.

It should be kept in mind that the disclosed free piston engine has a cylinder which receives for oscillation therein a piston entirely free from mechanical or hydraulic connections to the cylinder or to structure located outside of the cylinder. The oscillation of the piston is controlled by means including typically at least a pair of control ports spaced apart axially of the cylinder and disposed so that at least one of them is traversed by the piston upon oscillation thereof in the cylinder. The pressure differential sensed across the control ports upon the piston passing over the one port is used in the control of the oscillation of the piston.

First may be described means for starting the engine. The particular form of engine as described is primarily adapted for constant load operation, as for example in pumping applications or for marine drive. Other forms will be described which are considered preferable for variable load applications, for example for vehicle drive. Thus, for starting the presently described form of engine it is necessary merely to bring the rotary units up to speed, start of oscillator, and apply the load by a clutch. Let us first assume that both rotary units, the power turbine 8 and the pressure converter 5, have been brought up to speed by auxiliary means (not shown). This can be done by opening relief valves 120, 121 and 122, so that the reservoirs 14, 19 and 22 are maintained at atmospheric pressure. Under these conditions, and with the load unclutched from the shaft 9, the turbine units carry no load, and the auxiliary means for bringing them up to speed, such as auxiliary motors connected to their shafts, have to supply power only to overcome friction and inertia.

With the turbines thus coasting the oscillator is now started. To accomplish this, two operations are necessary. First, with the cylinder vertical, as is preferable, and after a period of shutdown, the pistons will have settled to the bottom, and need to be moved to central position. Second, a pulse of energy needs to be supplied to start them in operation. An auxiliary starting reservoir 35 is maintained at high pressure, comparable to the maximum pressure produced in the central volume of the oscillator during operation. During operation this pressure may be produced through a check valve 36, connecting the reservoir 35 through a fine tube 37, a conduit 38, and a central port 39 to the center volume of the oscillator. For initial starting, or in case of leaks, pressure may be produced in the reservoir 35 by an auxiliary pump (not shown), through a pipe 40. A valve 41 in the conduit 38 is normally closed during operation of the engine.

To bring the pistons to center a valve 42 is opened. This supplies a small flow of air from the reservoir 35 for a number of purposes. Through a fine tube 43, the valve 42 supplies pressure which closes off a duplex auxiliary valve 44 in the conduit 24 and in a conduit 45 which connects the buffer volumes. Similarly through a fine tube 46, the valve 42 supplies pressure which closes off the check valve 18. The reed check valves (not shown) in the conduit 17 at the ports 31 and 32 preclude back flow. The construction of valves 44 and 18 will be described later. Through a tube 47 it admits air to the lower end of the cylinder which is now otherwise closed off. This causes both pistons to rise in the cylinder. They are slightly separated by springs 48 and 49 on the piston ends, these springs being sufficiently short so that they do not come into effect during normal operation. At the same time that the valve 42 is opened a valve 50 is also opened. This connects the cylinder to the atmosphere through a small auxiliary port 51, whereat the pressure difference between the line 47 and the port 51 is subsequently reduced to zero. Since there is leakage through port 51, the lower piston will not rise much above the port but will be held with its lower end subsequently even with the port. The pistons hence rise until the bottom of the lower piston uncovers the port 51. This port is so placed that the pistons rise to a position slightly above a position in which they are equally spaced from the center of the cylinder. This slightly elevated position tends to compensate for the action of gravity until the engine is well started.

With the pistons in this generally centered position in the cylinder, the second operation may now be performed. The valves 120, 121 and 122 are closed, and the valve 42 is closed, and the tubes 43 and 46 are vented to the atmosphere through a valve 52, thus restoring the duplex valve 44 and the check valve 18 to normal operating condition. A brief interval later the valve 41 is opened momentarily, thus introducing a powerful pulse of gas between the pistons. The duration of this pulse should be such that it continues for a considerable portion of the outward stroke of the pistons. The pistons hence recede violently, bounce on the buffers, and return. The air between them is highly compressed and heated. Into this hot air fuel is injected at the top of the stroke. Normal operation thus starts. The load is now clutched to the shaft 9 and operation proceeds. It will be noted that, in the interval between closing the vents 120, 121 and 122, and the pulse through the valve 41, the pressure converter set 5, due to its inertia, will have introduced some pressure into the reservoir 22 ready for scavenging. Also, if the coasting speed of the turbine 8 is properly chosen, pressure will build up promptly in the reservoir 14 as soon as operation begins.

The various starting operations as described may be performed manually, but may be arranged to be semiautomatic. The valves, as described, can all be assembled in a single cylindrical valve. A single rotation of such a valve may then be caused to produce the appropriate opening and closing of passages as described in the proper time sequence and for the proper intervals. On pressing a single button this valve may then be caused to go through a single revolution under the control of a small auxiliary motor, thus starting the engine.

The duplex valve 44, in the above description, may include simple poppet valves, each closed by an auxiliary piston, as shown in FIGURE 3. Pressure from the reservoir 35, through the valve 42, enters through the tube 43 to press each piston 53 of the duplex set downward and close the valves. Each valve is normally held open by a spring 54. Pipe connections 55 and 56 connect the duplex valve in the conduit 24 and the conduit 45, respectively. In this and similar figures, methods of making the valve in parts for assembly purposes are not shown, as they may be methods which are conventionally used in practice.

The check valves 18 and 23 may be reed type check valves as conventionally used in air compressors. These have the advantage of being very rapid acting, and of affording a construction which minimizes idle space in valve connections. In that case the valve 18 may be constructed as a reed valve with a piston such as that shown in FIGURE 3 for closing it off.

The means for maintaining synchronism will now be described. The pistons are made of identical mass within close limits. Their individual natural frequencies of oscillation are determined by their mass and the pressures they experience on their faces. The total pressures on the two central faces are closely identical. The pressures on the outer faces are also nearly equal due to interconnections. Thus, the natural frequencies of oscillation of the two pistons will be nearly the same. If started substantially in synchronism they will tend to depart from this condition only very slowly. Nevertheless, means is necessary to prevent them from drifting apart. Any tendency toward unsynchronous operation may largely be damped by arranging the engine so that the two buffer volumes are interconnected by the conduit 45, which is normally open. A valve 57 in this conduit may be adjusted to give this conduit 45 a desired resistance to air flow through it. When the pistons are oscillating in exact synchronism and are entering the buffer volumes to the same extent, buffer pressures are identical at all instants and there is no flow through this interconnecting conduit. However, if synchronism is departed from there is a flow through the conduit and a consequent interchange of energy between the pistons. When the resistance to flow is at optimum value there is then a strong tendency for the pistons to pull back into synchronism, that is to return to a condition in which they oscillate at equal amplitudes, and in time phase. Any form of oscillation, except in synchronism, is damped out by losses in the interconnecting conduit. Thus, whatever the form of oscillation, it tends to revert to the condition in which there is no flow through the conduit, that is to synchronism. Thus, a very simple means for maintaining synchronism is available. It will be noted that, if the interconnection 17 and 24 of the end volumes used in connection with the functioning of these volumes as compressors are given appropriate values of resistance to fluid flow, there is an additional synchronizing effect due to these connections also.

With interconnected end volumes and buffers there is a tendency for the pistons to depart from the condition in which they oscillate symmetrically about the center of the cylinder, due to the effect of gravity on the pistons, when the cylinder is operated in a vertical position, as in the preferable arrangement. Gravity forces are small compared to the very large accelerating forces acting on the pistons, but their effect is cumulative. A means of offsetting or compensating for this effect, and thus causing the pistons to oscillate with central symmetry, will now be described. In FIG. 2 is shown a valve 58 such as a cylinder valve which introduces a slight resistance into the flow in the part of the conduit 24 which serves the upper end volume of the oscillator, this conduit being in the suction line from the reservoir 22. The position of this valve is determined by the average pressure in flue tubes 59 and 60, connected to small special cylinder ports 61 and 62. When the piston oscillation is centrally symmetrical, the pressures in these pipes are at all times equal, and the valve 58 is then at central position. When symmetry is departed from, the pressures are unequal and the valve is displaced from its central position. Due to the resistance of the valve, the upper end volume, during the suction part of the cycle, has a slightly less pressure than the lower end volume. If this difference in pressure is correct it will just offset the effect of gravity on the pistons. It is the function of the valve 58 to adjust this resistance, when symmetry is departed from, in such manner as to restore it.

A suitable form of the valve 58 is shown in FIG. 4. When the pressures supplied through the tubes 59 and 60 are equal, the piston 63 is held in mid-position by springs 64 and 65. In this position the resistance to flow through the conduit 24 is just such as to offset gravity. The tubes 59 and 60 are of small bore, and the pressures acting on the piston are thus substantially the average of the pressures acting on the ports 61 and 62 when these are open. If the pistons sag below the position of central symmetry, the average pressure supplied through the tube 59 will be decreased relative to the average pressure supplied through the tube 60. The valve will hence move over to a position where it offers greater resistance to flow. The resulting pressure difference between the oscillator end volumes then tends to restore the pistons to a position of central symmetry. Departure in the opposite direction produces the opposite effect.

Now, any such balanced control requires the presence of a damping factor to ensure stable operation, as was the situation in connection with the synchronizing means. This is the reason for the additional parts of the valve 58 as shown in FIG. 4. An end piston 66, of relatively small diameter, cooperates in moving the piston 63. It receives actuating pressures through very fine tubes 67 and 68 from the volumes 71 and 72 which apply pressure to the piston 63. A vent 69 is for the purpose of preventing leakage along the connecting rod 70 from affecting the operation. When the pressures in the volumes 71 and 72 are steady, equal unit pressures exist in the volumes 73 and 74, and the piston 63 is deflected in accordance with the difference of pressure existing as described above, because of the difference in effective areas. However, suppose the pressure in volume 71 is falling, because the pistons of the oscillator are gradually descending from their position of central symmetry. The pressure in volume 73 is greater than in volume 71, because of the lag in equalizing flow produced by the fine tube 67. Similarly, as the pressure in volume 72 is rising, that in volume 74 is less than in volume 72 because of the lag induced by the fine tube 68. Thus, when the pistons of the oscillator are gradually descending, the movement of the piston 63 is greater than it would be if the pressures in volumes 71 and 73, and the pressures in volumes 72 and 74, were equal. There is thus a greater correcting effect present because of the rate at which the oscillator pistons are departing from their central position. Conversely, when the correction has overcome the tendency to depart, and the pistons are gradually returning to their central position, the correction is less than it would be with balanced pressures. This effect introduces a damping term into the operation and renders it stable.

The pistons of the main oscillator may now be described. It was noted that they experience very little side thrust indeed. The only way that gas flow can produce side thrust on the piston faces is by reason of viscous drag due to unsymmetrically circulating gases, and these forces are very minute. The cylindrical surfaces will experience no side thrust due to the pressure at ports if these are symmetrically placed, and all ports may be symmetrical. Even small ports used for control purposes, shown as single ports in the drawings for simplicity, may be made double and located on a diameter to produce symmetry. If the engine is mounted on a vehicle which experiences lateral accelerations, inertia forces produce a side thrust on the pistons. These are however small, amounting to only a fraction of the piston weight except under very extreme conditions, and the gaseous forces acting on the pistons are very large by comparison. Now a smooth cylindrical piston moving in a smooth cylinder, with a small difference in diameter between piston and cylinder, tends to maintain itself central when there is a difference of pressure axially across it and hence a small leakage flow along its cylindrical surface. This is for the reason that, if the piston departs from center, the velocity of flow increases through the part of the path which is thus widened, the pressure in this part of the path thus decreases, and this tends to draw the piston back to center. These centering forces may be very large when the pressure difference axially across the piston is large, even though the leakage flow is small. Hence, the pistons as described will tend to center themselves. They will ride upon a film of air and be thus lubricated. There will be little or no metal to metal contact, and hence little or no wear of piston or cylinder. There is thus produced, and it is believed to be novel, a portion of a useful engine having reciprocating pistons and operating with gaseous lubrication.

The pistons should be constructed with a large number of narrow and shallow grooves 74a in their cylindrical surfaces, lying in planes perpendicular to the axis of the piston. There may be several hundred of these, a few thousandths of an inch to a hundredth of an inch wide and deep, equally spaced, and not necessarily finely finished. The lands between the grooves furnish the smooth piston surface and are very accurately finished. These grooves accomplish two purposes. First, they greatly decrease the leakage flow past the piston. The resistance to flow in a smooth channel is greatly increased when the channel is interrupted by numerous small pockets, for the entering and exit losses in pressure in these pockets may be large compared to those in an equivalent length of smooth channel. Second, the flow into and out of these pockets varies along the piston, and this ensures that there are centering forces present even when the pressures on the two piston faces are equal. By such construction, and with small difference of diameter between piston and cylinder, of the order of two or three thousandths of an inch for an engine of moderate size, leakage past the piston may be rendered entirely tolerable, even at the high pressure employed, and in the absence of piston rings. A helical groove will also suffice.

The pistons should be hollow and of light weight. The forces which they experience are largely axial and light weight hollow construction may readily be made to withstand these forces adequately. The lighter the pistons the higher the frequency of operation, all other things remaining unaltered, and the greater the output from a given oscillator. The upper practicable frequency is set by losses due to gas flow in passages and by conditions of fuel injection and burning. Passages should be generously proportioned and designed for low gas flow resistance. Fuel injection equipment may be made to operate very rapidly and positively by proper design. There is here no practical limit set to piston speed by reason of conditions involving lubrication. Hence, frequency and output may be made large.

Since there is no lubricating oil present there is no reason from this standpoint for cooling the cylinder. If the walls of the cylinder become hot, the efficiency of the engine is increased due to decreased losses caused by heat transfer between gas and walls. If cylinder and pistons increase in temperature to the same value, and are made of materials of equal coefficients of expansion, dimensions remain proportional, and in particular piston to cylinder clearance remains essentially unchanged. The ideal situation, therefore, is to allow the cylinder and pistons to come to an equilibrium temperature during operation, and cause this temperature to be uniform throughout. This ideal can of course only be approached, but it may be approximated closely enough to ensure proper piston to cylinder clearances at all times. With the thin air film between pistons and cylinder, the pistons tend to come closely in temperature to the average of the temperatures of the cylinder wall they move adjacent to. Heat transmitted into the piston faces is thus transferred readily to the walls. The entire oscillator may be lagged with thermal insulating material. If necessary, the hot exhaust gas from the center volume may be led through jackets about the ends to aid in establishing uniformly. The resultant equilibrium temperature will be well within the practical operating temperature of available alloys. The extent to which the ideal condition is approached in practice depends upon many practical considerations and the use to which the engine is to be applied. Uniformity should be secured closely enough to allow the use of small piston to cylinder clearance. To aid in this connection, if the pistons tend to become too hot compared to the cylinder, fins may be employed on the outer piston faces to aid in heat transfer to the cooler gases in the end volumes of the oscillator.

With no oil lubrication and with good combustion there should be no deposit on the pistons or cylinder walls. The ends of the pistons may be made sharp if desired to cut off minor deposits if they occur. The inside of the cylinder and the piston faces may be made of highly non-corrosive metal such as chromium or stellite, and highly polished. This tends to cut down radiation transfer between hot gases and the walls. It thus allows the use of higher maximum temperature and tends to increase efficiency.

The fuel injection and control means will now be described. It is highly desirable that fuel injection should be so controlled as to maintain constant amplitude or oscillation. The oscillator will then, in a sense, take care of itself during changes of load or other conditions. A nearly equivalent procedure is to so control fuel injection as to maintain a constant value of maximum pressure in the end buffers of the oscillator cylinder. In FIGS. 1 and 2, the fuel injection and control means is shown at 2 and 119, respectively. For purposes of control the pressure in an end buffer is led to the control mechanism 119 through a tube 75. The timing is controlled by pressure furnished to the controller 119 through a tube 76 which connects to two small auxiliary ports 77 and 78. The port 77 is closed by the piston as it nears the end of its compression stroke and simultaneously the port 78 is uncovered by the opposite end of the piston. A tube 79 conveys pressure from the reservoir 35 to the control unit 119 to furnish power for operation. This is so that there will be ample pressure available on starting. The gas drawn from the reservoir 35 is replenished through the tube 37.

FIG. 5 shows the control mechanism 119. For purposes of illustration, this is shown applied to a relatively simple form of injector as used in diesel engine practice, but the same principles may readily be applied to injectors of more complicated and advanced type. A fuel injection piston 2 is connected to the injection orifices 118. During injection, the piston is forced forward by a powerful spring 80, to produce fuel pressure of the order of 10,000 pounds per square inch. This spring is adjustable to control the rate of fuel injection and thus produce substantially isothermal expansion during the period of injection. When the injection piston is forced back, as will be described, fuel enters through a check valve 81 from the fuel source, preferably supplied with a float chamber to maintain constant level, and avoid fuel flow at slow rate when the engine is idle. The fuel tubes connecting to the orifices 118 are so fine that oil recedes in them only a short distance during periods of suction.

The movement of the injection piston 2 is controlled by a relay 82 and an oil dashpot 83. The piston 84 of this relay constitutes a valve. When it is against its left hand stop, the volume 85 is connected through the tube 79 to the reservoir 35, and the high pressure from this reservoir moves the injection piston 2 back against a stop 86 and so compresses the spring 80. When the piston 84 moves against its right hand stop, the volume 85 is connected through a tube 87 to the atmosphere, and positive injection occurs. A tube 88 connects one end of the relay 82 to the center of the oscillator through a small auxiliary port 118 in the cylinder. The tube 76 connects the other end of the relay 82 to the two auxiliary ports 77 and 78 mentioned above.

When the lower piston of the oscillator is at a low position, the port 77 is open and the port 78 is closed, and the pressures on the two ends of the relay 82 are balanced. Under these conditions, the spring 89 holds the piston 84 against its left hand stop, and the injection piston 2 is retracted. When the oscillator piston approaches the position of maximum rise, the port 77 is closed and the port 78 is opened. The pressure in the right hand end of the relay 82 is abruptly reduced. The piston 84 moves over against its right hand stop. The pressure in the volume 85 abruptly drops to atmosphere, and fuel injection occurs. As the oscillator piston moves down the relay piston 84 and the injection piston 2 are restored to their previous positions. The purpose of the dashpot 83 is to introduce a controlled time delay into the movement of the relay 82, thus providing that injection will begin at the top of the stroke of the oscillator pistons, and also to provide for positive motion of the piston 84 of the relay 82 after this time delay. The piston 90 of the dashpot 83 is located in a cylinder filled with oil, and is mechanically connected to the piston 84. A tube 91, with an adjustable needle valve 92, connects the two ends of the dashpot, causes the piston 84 to move slowly when it begins its movement to the right, and introduces the controlled time delay. After a short movement of the piston 90, however, it opens a port into a shunt pipe 93, and the balance of the movement is abrupt. A connecting pipe 94, including a check valve 95, allows a rapid return of the piston 90.

Control of the amount of fuel injected per cycle is exercised by a wedge 96, which alters the position of the stop 86. The wedge 96 is mounted in guides on a support 97 so that it can move vertically. The wedge 96 is controlled in its vertical position by a piston 98 located in a control cylinder 99, the mechanical connection being made so that the wedge 96 is fully constrained vertically, but is otherwise free to move in its guides without binding. The two ends of the cylinder 99 are connected to a chamber 100, the lower connection being restricted by a needle valve 101. The piston 98 is forced upward by a spring 102. A chamber 100 is connected through a check valve 103, and the tube 75, to the buffer volume at one end of the oscillator cylinder. The chamber 100 also has a connection to atmosphere through a needle valve 104.

The operation is as follows. The pressure in the chamber 100 follows closely the maximum pressure developed in the buffer volume, and hence is a measure of the amplitude of oscillation. Each cycle, air enters through the tube 75 to bring the chamber 100 to maximum buffer pressure. A leak 104 ensures that, if maximum buffer pressure is falling, the pressure in chamber 100 will follow it down. The lag introduced is small, however, and the pressure in the chamber 100 is at all times closely related to the maximum buffer pressure of the previous cycles. When the amplitude of oscillation, and hence the buffer pressure and the pressure in the chamber 100 is steady, the pressures in the two ends of the cylinder 99 are equal. The forces on piston 98 are, however, unequal because of the difference in effective area of the two sides of the piston 98. The wedge therefore takes up a position determined by the pressure in the chamber 100 and the force of the spring 102. The amount of fuel injected per cycle is thus made to depend directly upon the amplitude of oscillation of the oscillator pistons. If that amplitude is increased the wedge is forced down and the fuel injection is decreased. By proper choice of dimensions, wedge angle, and spring pressure, equilibrium will be attained when the desired amplitude of oscillation occurs. Departure from this condition of specified amplitude produces a rapid alteration of fuel injection in such direction as to restore the specified amplitude. The amplitude may thus be made to decrease only slowly with increase of load and hence with increase of demand for fuel.

As in the case of controls previously described, however, a damping effect is necessary to render the control stable in operation. This is provided for by the presence of a needle valve controlled duct 101 between the chamber 100 and the cylinder 99. This produces a lag in the pressure in the lower end of the cylinder 99 as compared with that in the upper end. If the amplitude of oscillation is gradually increasing above its specified value, and the average pressure in the chamber 100 is hence rising, the pressure at any instant in the lower part of the cylinder 99 will be less than it would be for the same pressure in the chamber 100 under steady conditions. The correction, in the form of a reduced fuel supply, is hence a greater correction than would be applied under steady conditions. Conversely, where the amplitude is returning toward its specified value, the correction applied is less than under steady conditions. This effect is such as to produce stable operation of the control. There is thus provided a fuel control which will stably regulate fuel injection in such manner as to cause the amplitude of oscillation to remain nearly constant.

The power stroke of the center volume of the oscillator should be substantially longer than the compression portion of the return stroke. This is for the reason that, while both strokes work over nearly the same range of pressure, the gases are hotter during the power stroke. In FIG. 2, it will be noted that the exhaust ports are much longer than the inlet ports. The location is such that, when the pistons are oscillating symmetrically about the center, both sets of ports become fully uncovered at approximately the same instant. The exhaust valve 13 should remain closed until nearly the end of the power stroke. It should then open abruptly, and should remain open during the return stroke until the exhaust ports are covered. This may be accomplished in several ways.

A preferred form of valve 13 for this purpose is shown in FIG. 6. A pipe 105 connects the valve to the manifold which surrounds the long exhaust ports, and a pipe 106 connects to the reservoir 14. The valve is in the form of a poppet valve 107 controlled by a piston 108. The upper end of the valve cylinder 109 is connected through a tube 110 to two small auxiliary ports 111 and 112, FIG. 2. The upper one, 111, is uncovered by the piston in descending just as the exhaust ports 30 become full uncovered. The lower one, 112, becomes covered by the lower part of the piston just at the same instant. The lower part of the cylinder 109 is connected by a tube 113 to a port 114 below the port 112. A spring 115 tends to hold the valve 107 closed. The action is as follows. As the piston 11 descends, toward the end of its down stroke the pressures on the piston 108 are substantially equal, for ports 112 and 114 are open, and port 111 closed. The spring 115 then holds the valve 107 closed. When exhaust ports 30 are uncovered the valve is further held closed by the difference between cylinder pressure in the oscillator and reservoir 14. As the piston descends further the port 112 is closed and the port 111 is opened. When this occurs a higher pressure exists in the lower part of cylinder 109 than in the upper, for pressure in the compression volume of the oscillator is then higher than in the central volume. This pressure difference abrutly opens the valve 107, and exhaust occurs. As the piston of the oscillator starts up, the port 112 is again opened and port 111 is closed and the pressures across the cylinder 109 again equalize. The valve 107 then starts to close under the influence of the spring 115. It does not, however, close until the exhaust ports 30 have again been covered. In order to ensure the proper delay in closure a light check valve 116 may be placed in the line of the tube 113, and bypassed by a very fine tube 117. This delays the closure but not the opening.

It will be noted that the simplified diagram of FIGURE 1 shows a closed system connection of the end volumes of the oscillator and the power turbine of the pressure converter set. The pump part of the pressure converter set draws in amospheric air and compresses it for scavenging purposes. In the diagram of FIGURE 2 this closed system is connected to the output of the pump part of the pressure converter, thus establishing the lower pressure in the closed system to be equal to the pressure in the scavenging reservoir. This results in a simple diagram of the form of FIGURE 7, in which reservoirs and control system valves and connections are again omitted. It is not necessary that these two pressures be made equal, however, if design considerations render it desirable to make them proportional but in a ratio other than unity. For example, the connecting pipe A, leading from the output pipe 6, instead of being connected to the lowest pressure point of the closed system as shown in FIG. 7, may be connected to an intermediate point, between stages, of the power turbine of the pressure converter 5. This will result in a lower average pressure in the closed system. On the other hand if a higher average pressure is desired an extra stage may be added to the power turbine of the pressure converter and inserted in the interconnection A. This extra stage may have very small passages, as it is called upon merely to establish differences of pressure, and there will be no flow through it except on starting and during load changes.

An alternative method of starting the engine may now be decribed. This has the advantage, compared to the method previously described, of not requiring that the turbine units be brought up to speed by auxiliary means before starting the oscillator. Consider that an engine is being employed having the simplified diagram of FIG. 7. Let a set of valves be introduced in the main connecting conduits which, when operated, transform the simplified diagram into that shown in FIG. 8. This can be accomplished by three valves, if all the pipes shown in either figure are included, one at A which closes the pipe off, one at B which closes off the pipe below it and opens the pipe above it to the atmosphere, and one at C which closes the inlet of the turbine pump to the atmosphere and connects it instead to the output of the power turbine of the pressure converter set. These three valves may be mechanically connected to all, be operated by a single lever, moved manually or by an automatic starting apparatus.

With the connections of FIG. 8, the compressor portion of the oscillator supplies air which flows through both units of the pressure converter set to the scavenging reservoir. Note that, when the turbines are stationary, there is no pressure drop across them except that due to friction in the gas passages. Now let the steps be taken to start the oscillator, as has been described, first bringing the pistons to central position, and second introducing a pulse of high pressure air between them to start them in motion. Since the end volumes and the center volume of the oscillator are nearly equal, there will be supplied from the oscillator ends, under these conditions of very small pressures everywhere, sufficient air for scavenging. The oscillator will therefore continue to oscillate, and will come to equilibrium conditions under the influence of the various controls. There will be a flow of air through the power turbine which will start it rotating if it has only a frictional load. The flow through the power turbine of the pressure converter will tend to bring this unit up to speed. Flow through the compressor unit of the pressure converter is in the direction in which this unit tends to drive the air. After the pressure converter has arrived at a reasonable fraction of its normal speed the three valves A, B, and C noted above may be restored to normal position, establishing the connections of FIG. 7, and operation will continue under these conditions. At proper turbine speed the clutch may be gradually engaged and the load picked up. In fact, with certain types of load, it may be possible to dispense with the use of a clutch.

It is possible to carry small loads under the simplified connections for starting shown in FIG. 8, and without the use of a pressure converter. The connections then become merely those shown in FIG. 9. The compressor ends of the oscillator now serve directly to furnish supercharging to the center volume of the oscillator. The reason this is useful only for relatively low loads is as follows. At light loads, when pressures are small, the compressor ends can furnish nearly full volume for scavenging each cycle. However, as load is increased pressures rise, the volume delivered by the compressor ends falls, and scavenging is incomplete. Even though there may still be enough fresh air introduced per cycle to sustain combustion only a fraction of the center volume is, in effect, being utilized per cycle, and this greatly limits the load that can be carried. This is the reason for including a pressure converter in the assembly. Each unit of the pressure converter will be called upon to handle roughly half of the power developed in the power turbine. The total turbine capacity present will then be roughly twice that of the power turbine alone.

For some applications it is desirable to construct multicylinder engines. This will result in a more compact engine. The amount of reservoir capacity necessary is reduced. Moreover, there is a general relationship applying to reciprocating engines, namely that the weight per horsepower of output of geometrically similar engines operating at the same maximum piston speed, and with the same pressure cycle, is proportional to the linear dimensions of the engines. Thus, a multicylinder engine will weigh less than a single cylinder engine of the same output. This relation applies to the oscillator unit of the present engines.

Assume that, for example, three units according to FIG. 2 are joined by interconnecting reservoirs, that is by installing a pipe to connect all three of the respective reservoirs 19, all three of the respective reservoirs 22, etc. Each group of three may in fact be made into a single reservoir with entering and exit pipes for each unit. A single power turbine and a single pressure converter will serve all three units. There is thus provided an engine having three oscillators, each of which may have one-third the capacity of that used for a single oscillator engine of the same output. If the reservoirs are all of ample size, so that their cyclic pressure variations are negligible, the three oscillators will operate independently. The oscillators do not, in fact, need to operate at exactly the same frequency. It will be noted that there is no problem of vibration here, as there is in an engine in which the pistons are mechanically connected to cranks. An oscillator, with its pistons in synchronism, does not vibrate appreciably. However, it is preferable that the oscillators should be constructed so that, in independent operation, they have closely the same frequency, and then should be caused to operate in proper time phase. The cyclic fluctuations will thus be reduced, in reservoirs and in the turbine units.

The oscillations may readily be started in appropriate relation, that is at 120° in time phase. Each oscillator has its own starting means as has been described, and in the preferable form the various valves of the starting device are automatically operated in proper time sequence by a mechanism which is set in operation by a single manual operation such as pressing a starting button. The three starting mechanisms for the three oscillators above may be joined into a single mechanism, so that the time sequence is maintained for each unit and so that the operations for the several units are related in time so as to start the three oscillators in proper time phase. Now suppose that all common reservoirs are so large that pressure fluctuations are negligible, except for the common intake reservoir 22, which is made relatively small. When the units are operating at 120° they will still be operating under substantially identical cycles. But suppose one unit, for some reason, becomes advanced in time ahead of its appropriate position. It will find the pressure in the intake reservoir below normal, for there will have been less than a normal interval for it to have become replenished by flow from the pressure converter. A lesser average pressure in the compressor end of the unit corresponds to a lesser effective spring constantly affecting its oscillations, and it will hence tend to operate at less than normal frequency. This will cause it to drop back in phase, that is toward its proper time phase position. If it lags the opposite effect occurs. There is thus an effect present which tends to hold the three units in proper time phase relationship. A similar effect occurs if the size of the output reservoir is reduced. Thus, with moderate sized reservoirs on inlet and outlet, and adequate reservoirs otherwise, there is a tendency for multicylinder engines, of three or more oscillators, to automatically maintain proper time phase relationships. Various devices could be added to enhance this tendency, but they appear to be unnecessary.

The matter of vibration was noted above. It is quite possible to construct and operate single ended units, that is, oscillators which contain only a single piston. Such units would vibrate severely. But they need not be mechanically connected to other parts of the engine, except through conduits and tubes. These can be made flexible and the oscillator may be spring mounted. It is also necessary to modify the scavenging flow when an oscillator as has been described is, in effect, divided in the middle. This can be accomplished by using a check valve in the inlet to the power end of the oscillator. Thus, a single ended oscillator may be successfully constructed, and it needs no synchronizing means, or means for offsetting gravity on the piston. However, the two-piston unit, with its freedom from vibration, is preferable.

In the description of the engine, thus far, the pressure converter unit has been described as a rotary unit comprising two mechanically coupled turbines. For some applications this is the preferable form. For others it is preferable to utilize as a pressure converter a second oscillatory unit. In a typical case, assuming equal frequencies of oscillation, the pressure converter oscillator should be about 60% greater in dimensions than the main oscillator which it serves. However, its frequency of oscillation is limited only by speed of valve operation and flow through passages, since it has no fuel injection, and it may hence be designed for comparatively high frequency of operation. A pressure converter oscillator may be used for transforming the energy of compressed air from one pressure range to another. In fact, an engine for converting the energy of fuel into energy of compressed air, without rotary parts, may be constructed of a main power oscillator, a pressure converter oscillator which serves it, and, if desired a second pressure converter oscillator to transform the energy in the exhaust from the power oscillator into the energy of clean air at a convenient pressure for use. This description will, however, be concerned with a pressure converter oscillator to serve as the pressure converter of an engine as already described, substituting for the rotary pressure converter thus far considered. The engine as considered thus far, it has been noted, is especially adapted to conditions in which the load is nearly constant. In describing the oscillatory pressure converter a form of this device will be described which enable the engine of which it is a part to carry loads which vary greatly, as for example, in vehicle drive, An oscillatory pressure converter is shown in FIG. 10. The reservoir 19, also shown in FIG. 2, is the high pressure reservoir into which the output is delivered from the compressor volumes of the main oscillator. The reservoir 22, also shown in FIG. 2, is the moderate pressure reservoir which supplies scavenging air to the power oscillator, and also supplies input to the compressor volumes of the main oscillator. As shown in FIG. 10, the pressure converter oscillator cylinder 122, contains pistons 123 and 124. Ports 125 and 126 serve the end volumes, and ports 127 and 128 the central volume. Beyond ports 125 and 126 are buffer volumes 129 and 130, to reverse the direction of motion of the pistons. The end volumes of the cylinder are connected by a conduit 131 and an intake conduit 136 to maintain synchronism. The conduits 131 and 136 can include restricted orifices of valves like the valve 58 (FIG. 2 and FIG. 4) as has been described. Between ports 127 and 128 there is a dead space to prevent the pistons from colliding under unusual circumstances. Power is supplied the oscillator by high pressure air which flows from the reservoir 19 through a conduit 132 and a special valve 133 to the central ports 127 and 128. Exhaust from the central volume flows through a conduit 134 and a special valve 135 to the moderate pressure reservoir 22. Power developed in the center volume is utilized in the end volumes to compress air. Intake air flows through the conduit 136, the check valves and the ports 125 and 126 to the end volumes. The compressed air flows out through these ports, through a check valve (not shown), and through a conduit 137 to the reservoir 22.

The special valve 133 is designed to open to admit air from the reservoir 19 to the central volume of the pressure converter oscillator when the exhaust stroke is completed, that is when the pistons pause at the completion of their inward stroke and reverse their direction of motion. It remains open for an interval and then closes. The length of this interval determines the amount of energy per cycle supplied from the reservoir 19. This in turn determines the output of the pressure converter, that is the pressure and rate of flow of scavenging air supplied to the power oscillator, and thus the power supplied to the power turbine. It hence offers a convenient means for maintaining turbine speed approximately constant over reasonable variations of load on the power turbine shaft. For this purpose the interval during which valve 133 remains open is made responsive to the turbine speed, with provision for a damping factor to ensure stable operation. The speed of the turbine, at a given load, may then be conveniently controlled by adjusting this relationship.

An important consideration in this connection is the following. The energy delivered per cycle to the pressure converter oscillator from the reservoir 19, all other conditions remaining unchanged, increases when the interval that valve 133 is opened is decreased. Consider that the power turbine is operating at constant load and speed, that is, with constant pressure across it. Then the pressure in the reservoir 22 will be constant, for its pressure is above that of the turbine only by reason of frictional pressure drop during the interval of scavenging. At constant amplitude and frequency of the power oscillator the mass of gas per cycle drawn into its compressor volumes per cycle is hence constant, and this same mass of gas per cycle is delivered to the reservoir 19. This reservoir hence has a constant inflow of gas, in terms of mass of gas per second. The outflow from the reservoir 19 depends upon the pressure in the reservoir 19, and the interval that the valve 133 is opened, the volume transferred to the cylinder per cycle being proportional to the distance the pistons 123 and 124 move while the valve is open. If this distance is called $d$, the volume transferred to the cylinder per cycle is directly proportional to $d$. But the specific volume, compression being adiabatic, is proportional to $p^{-1/k}$. Thus, the mass transferred per cycle is proportional to $dp^{1/k}$. For steady conditions this must be proportional to the rate of mass inflow to the reservoir 19. Hence, as the valve interval, and $d$, are increased the pressure $p$ drops. The energy delivered to the pressure converter oscillator, per cycle, from the reservoir 19, is proportional to $dp$. Since $p$ is proportional to $d^{-k}$, this energy per cycle is proportional to $d^{1-k}$. For air $k$ is approximately equal to 1.40. Hence, the energy per cycle is proportional to $d^{-.4}$, and decreases when $d$ is increased, or when the valve interval is increased.

Thus, all other conditions being unchanged, if it is desired to increase the energy per cycle transferred from the reservoir 19 to the pressure converter oscillator, the interval during which valve 133 is opened should decrease. The pressure in the reservoir 19 will then rise at a rate dependent upon its size compared to that of the oscillators. This effect is enhanced if the pressure in the reservoir 22 rises, and the frequency of the power oscillator increases, with increase of load on the power turbine. It will be noted that, if the interval that the valve 133 is opened is decreased suddenly, the first effect will be to decrease power input to the pressure converter, but this will be followed by an increase within a few cycles, that is, within fraction of a second under typical conditions, as the pressures in reservoirs become adjusted to the new conditions. Changes in speed of the power turbine, under changes of load, are much slower than this effect, because of the large inertia of the turbine rotor. Thus, from the standpoint of turbine regulation the temporary drop in power is not of importance, and this renders it possible to construct a control for the purpose of maintaining turbine speed which will be stable in operation.

The special valve 135 is designed to open at the instant, as the pistons of the pressure converter are approaching center, when the pressure in the central volume rises to equal that in the reservoir 22. When all is adjusted properly, the valve 135 closes at a point in the cycle appropriate to discharge just the mass of gas that was admitted to the cylinder previously in the cycle. When that mass of air has been exhausted to the reservoir 22, the valve 135 then closes, and remains closed during the remainder of the cycle.

The cycle in the centeral volume is hence as follows. Beginning at the instant when the pistons are at their closest approach to center, the valve 133 opens, the pistons start to separate, and air flows at constant pressure from the reservoir 19 to the central volume. After an interval the valve 133 closes, and the air expands adiabatically driving the pistons. At the end of the stroke the pressure in the central volume has fallen below that of the reservoir 22. The return stroke now begins, and the pressure rises. When it reaches that of the reservoir 22, the valve 135 opens. Exhaust to the reservoir 22 now continues for an interval at constant pressure. The valve 135 then closes and the pressure rises until the end of the stroke and the completion of the cycle. A pressure-volume diagram is shown in FIG. 13, the path being abcdcea.

When the valve 133 opens, as the pistons pause at the conclusion of their inward stroke, the pressure across it should be nearly zero. Whether the pressure difference arrives at this point is determined by the interval the valve 135 is opened, and hence by the amount of air exhausted from the inner volume during the return stroke. If this interval is increased, all other conditions being equal, the pressure in the inner volume will not rise as high as the stroke is completed. The interval of opening of the valve 135 may thus be controlled to ensure that nearly zero pressure exists across the valve 133 at the instant it opens.

The cycle in the end volumes of the pressure converter oscillator is simple. As the pistons approach, air is drawn in from the atmosphere through the conduit 136 and its associated check valves (not shown). On the return stroke, this air is compressed adiabatically until the pressure reaches that of the reservoir 22. Exhaust then continues to this reservoir, through the conduit 137 and its associate check valves. The air in the cylinder end volumes becomes compressed until the kinetic energy of the pistons is absorbed, which results in the direction of piston motion being then reversed. On the return stroke this confined air expands adiabatically, giving up some energy to return the pistons. The air continues to expand as the pistons move inward until the pressure drops to atmospheric. Suction then occurs until the completion of the stroke.

It will be noted that the length of stroke of the pressure converter oscillator varies greatly with load. When the power supplied to it from the reservoir 19 is low, and its output, equal to this input except for losses, in the form of compressed air pumped by its end volume is also low, the excursion of the pistons to perform this pumping will be relatively small. As the load on the pressure converter increases, the stroke will increase to accommodate it. Even with different stroke lengths, the average pressure on the two sides of a piston can equalize, to allow the pistons to proceed without increase or decrease of average kinetic energy. The pressure in the central volume drops to low values so that equalization can occur even when the end buffers do not come into play.

An appropriate form of the special valves 133 and 135 may now be described in detail.

The valve 133 is shown in FIG. 11. This is a diagrammatic figure and, as is the case in other figures, joints to enable assembly to be made are omitted, as they may be in accordance with conventional practice. For the same reason vents and barriers to take care of leakage past pistons which might interfere with operation, provisions for returning leakage oil to a sump, and similar details are omitted for clarity.

The special valve 133 consists of the following principal parts. A poppet valve 138 controls a passage from the reservoir 19 through a pipe 139 through a pipe 140, to the central ports 127 and 128 of the pressure converter oscillator. This valve is actuated by a piston 141, working in a cylinder 142. Pressure in this cylinder is controlled by a balanced relay 143, having a piston 144. Interlocks 145, which are inactive when the relay 143 is controlling operations, are furnished to prevent false movements. When the valve 138 moves, it actuates a relay valve 146 having a piston 147. This controls passages to actuate a relay 148 to determine the interval during which the valve 138 is open. In this relay 148 there are a piston 149 to raise a plunger 151, and a dashpot with a piston 150 to delay its return. In the lower portion of the relay 148 is a piston valve 152 which controls connections to the cylinder 142. A pump 153, to be described, furnishes pressure to actuate the piston 149, through passages controlled by the valve 147.

The piston of the balanced relay 144 is lightly constrained toward central position by springs 154 and 155. The end volumes 156 and 157 are connected, by means of tubes 158 and 159, to the volume served by the pipe 140, and thus to the center volume of the pressure converter cylinder. However, a needle valve 160 is inserted in the tube 159. Thus, the pressure in the volume 157 lags behind that in the volume 156, being lower when the pressure in the central volume is rising, and higher when it is falling. Thus, when the pressure converter oscillator pistons pause and reverse direction at the time when they make their closest approach to center, the interlock 145 then being inactive, the piston 144 comes to central position. There is then a connection from the lower volume 161, of cylinder 142, through the central ports of the relay 143, to a tube 163.

At this time the piston 152 is in its upper position, as shown. There is thus a connection through the ports of this piston from the tube 163 to a tube 164, and thus through the pipe 139 to the reservoir 19. At the same time, the upper volume 162 is connected through a tube 165, and ports of the piston 152, to the atmosphere. A large difference of pressure then exists across the piston 141, and the poppet valve 138 is abruptly opened, admitting air from the reservoir 19 to the central volume of the pressure converter oscillator.

During the cycle of the pressure converter oscillator there are two other times when the center volume pressure becomes stationary, at least momentarily. One of these is when the pistons pause and reverse at the end of their outward stroke. The other is when the valve 135 is open, and air is being exhausted to the reservoir 22. It is desired that the relay 143 be positively made inactive at these times, to prevent false operations of the valve 138. For this reason, the interlocks 145 are provided. They are in two parts. A volume 166 is connected to the valve 135, in a manner to be described, through a tube 167. When the valve 135 is open pressure is furnished to the volume 166, forcing a piston 165 to the right, and clamping the piston 144 against its right hand stop. At all other times, the volume 166 is vented to the atmosphere and this part of the interlock is inactive. The volume 168, which acts similarly on a piston 169, is connected by a tube 174 to a relay 170. The piston 173 of this relay is urged upward by a spring 172. The upper volume of the relay is connected by a tube 171 to the end volumes of the pressure converter oscillator, by being connected to the pipe 131 which connects these. When the pistons 123 and 124 are at the end of their outward strokes the pressure acting on the piston 173 is hence high, and it is forced down against its spring 172 to its lower position. This opens a passage from the reservoir 19 through a tube 175, ports cooperating with the piston 173, and the tube 174 to the volume 168, forcing the piston 169 to the right, and clamping the relay 143 against its right hand stop. On the other hand, when the pistons 123 and 124 of the pressure converter oscillator are approaching center, suction is occurring in the end volumes, pressure in the buffer volumes is atmospheric or slightly below, and the piston 173 is forced against its upper stop by the spring 172. A passage is now open from the volume 168 through the tube 174, and ports cooperating with the piston 173, to the atmosphere. The interlock is thus inactive at the time when the relay 143 performs its desired function in causing the opening of the valve 138.

When the valve 138 is closed, the piston 147 is in its lowest position. At that time there are connections to cause the piston 149 to raise the plunger 151 against the force of a spring 176. A centrifugal oil pump 153 is mounted on the shaft of the power turbine, and thus furnishes a pressure proportional to the square of turbine speed. It may be very small, as it is called upon to furnish only a small flow of fluid. When the piston 147 is in its lowest position, this pump is connected through a tube 177 and a tube 178, to a lower volume 179 acting on the piston 149. At the same time, it is connected through a needle valve 180, and a tube 181, to an upper volume 182 acting on this same piston 149. The effective area of the volume 182 is less than that of the volume 179. Hence, even though the pressures furnished through the two paths are equal, the piston 149 is forced up against the spring 176, and ascends a distance depending upon the power turbine speed.

A bellows 183 is connected to the tube 181 and is distended through part of its safe range of operation by the maximum pressure from the pump 153. Since the bellows is connected to the pump through a needle valve 180, its pressure will lag behind that in the tube 177. Thus, the pressure in the volume 182 lags behind that in the volume 179. Hence, when the turbine speed is increasing, the plunger 151 will be raised a greater distance than would be the case at the same turbine speed if it were steady. Conversely, when the turbine speed is falling, the plunger 151 will be raised a lesser distance than at steady turbine speed of the same value. The distance the plunger 151 is raised determines, as will be seen, the interval during which the valve 138 remains open. The higher the power turbine speed, the greater this interval, and, as has been discussed, the less the power then furnished from the reservoir 19 to the pressure converter, and hence to the power turbine. This tends to regulate the power turbine at a nearly constant speed, and with a reasonable falling characteristic under load. Moreover, there is a damping effect present to suppress hunting. If a load increment is thrown on the power turbine, and it starts to slow down, the correction applied to bring it back to speed is increased because of the lag of pressure in the bellows 183. As it is returning toward its set speed, the correction is reduced by the same effect. A similar set of relations holds when the power turbine speed is increased. This effect is of a nature to damp out oscillations of power turbine speed about its set value, and thus result in stable operation. The time constant determined by the setting of the needle valve 180, and the spring constant of bellows 183, should be relatively large, a second or two, so that the performance of the control will not be unduly affected by momentary fluctuations in reservoir pressures, which occur when the time interval of the valve 133 is altered, and which subside within a relatively few oscillator cycles.

The various connecting oil tubes should be sufficiently large so that the flow occasioned by the variations of the small volumes 179 and 182 will cause frictional pressure drops which are very small compared to the operating pressures. It will be noted that when the plunger 151 is being raised, as has been described, the volume 184, which acts on the piston 185, is connected through a tube 186, an upper set of ports cooperating with the piston 147, and a tube 187, to a sump 188. There is thus substantially zero pressure in the volume 184, to interfere with the upward motion of the plunger 151, as has been described.

At the instant the valve 138 opens, the piston 147 moves to its upper position. The volume 179 is now connected through the tube 178, ports cooperating with the lower part of the piston 147, and the tube 189, to the sump 188, and thus has approximately zero pressure. The volume 182 is connected to the bellows 183 as before. The volume 184 is connected through the tube 186, ports cooperating with the upper part of piston 147, and a tube 190 to the pump 153. The effective areas of the volumes 182 and 184 being equal, and the pressures in these volumes nearly the same, the plunger 151 now starts to descend under control of the spring 176 and the dashpot piston 150. When the piston 150 moves upward it moves freely, by reason of flow through a check valve 191. When it descends it does so, at first, slowly, as oil flows through a bypass and needle valve 192. When, however, the piston 150 uncovers a port 193, there is a passage for free flow. The plunger 151 then descends rapidly, making contact with the end of the piston 152, and forcing the latter against its lower stop. This movement of the piston 152 results in prompt closing of the valve 138, as will be described.

The interval that the valve 138 remains open depends therefore upon the distance it moved upward, and thus upon turbine speed, upon the strength of the spring 176, and upon the setting of the needle valve 192. Thus, the interval is regulated to control power turbine speed. It will be noted that the pressure in the volume 184, during descent of the plunger 151, differs slightly from that in the volume 182, due to the time lag affecting pressure in the bellows 183. If the power turbine speed is rising the pressure in the volume 184 will be greater than in the volume 182, there will be a net upward force opposing the spring 176, the rate of descent will be less, and the interval during which the valve 133 is open will be increased. Conversely, if the power turbine speed is falling, the interval will be shortened. This effect is in the same direction as the one noted above, and tends to add to the damping effect due to the lag of pressure in the bellows 183. The spring 176, even at its greatest extension, exerts a substantially greater force than that due to the pressure difference between the volumes 182 and 184, caused by the lag of pressure in the bellows 183. If it is desired to manually adjust the speed at which the power turbine is controlled to operate, as for example when the engine is utilized to drive a vehicle, it may be done by manually adjusting either the spring 176 or the needle valve 192, for example by the position of a foot pedal. The spring 176 may be mounted externally to facilitate such adjustment.

When the piston 152 is moved to its lower position, as has been described, the volume 161 of the cylinder 142, is connected through a tube 194, and ports cooperating with the piston 152, to the atmosphere. The volume 162 is connected through a tube 165, and similar ports, to the tube 164, and hence to the pressure in the reservoir 19. The piston 141 is thus forced abruptly downward, and the valve 138 is closed. The plunger 151, and the piston 152, then move upward as has been described. The balanced relay 143 moves abruptly from its central position as this occurs, for the pressure in the central volume of the pressure converter oscillator falls rapidly when the valve 138 closes, as the pistons then have a considerable velocity. If necessary, to ensure closure of the ports of the relay 143 before piston 152 again arrives at its upper position, a slight restriction may be introduced in the tube 195 of the dashpot.

There is thus provided, in the valve 133, a positive means opening at the top of the stroke of the pressure converter pistons, and a means controlling the interval of opening in such manner as stably to regulate the speed of the power turbine.

The special valve 135 is shown in FIG. 12, which is diagrammatic. The valve 135 may have a form similar to that of the valve 133. A poppet valve 196 is controlled by a piston 197 in a cylinder 198. A balanced relay 199 determines the time of opening of the poppet valve, and is prevented from making false operations by an interlock 200. When the poppet valve opens it actuates a piston valve 201. This initiates action of a relay 202 which descends under control of a dashpot 203, and causes closure of the poppet valve. A variable fluid resistance controlled by a relay 204 determines the interval during which the poppet valve is open.

The poppet valve 196 is connected by a pipe 205 to the center volume of the pressure converter oscillator, and by a pipe 206 to the reservoir 22. The end volumes of the relay 199 are connected by tubes 207 and 208 to the pipes 205 and 206 respectively. The piston 209 of this relay is constrained toward its center position by springs 210 and 211. When the pressure difference across the poppet valve 198 is zero, the interlock 200 being inactive, the piston 209 will be in its central position, and the lower volume 212 of cylinder 198 will be connected, through ports cooperating with piston 209, to a tube 214. When the pressure difference across the poppet valve 196 departs from zero by a small amount, the piston 209 is forced against one of its end stops, and the volume 212 is connected to atmosphere.

The pressure in the center volume of the pressure converter oscillator becomes equal to that in reservoir 22 twice during a cycle, once when the pistons are separating and again when they are approaching. It is necessary to inhibit action of the relay 199 at the first of these instants. When the pistons are separating the pressure in the outer volumes of the oscillator is above atmospheric. The tube 215 of the interlock 200 is connected to one of these outer volumes, for example by being connected to the pipe 131 which interconnects the buffer volumes. Thus, at this first instant, the piston 216 is forced down against its stop. The volume 217 of the interlock 200 is then connected through a tube 218, ports cooperating with the piston 216, and a tube 219 to a tube 220. The tube 220 connects to the reservoir 19 which furnishes the pressure for operation of the valve 135 and its relays. The piston 221 thus forces the piston 209 against its stop, and the relay 199 is inactive. On the other hand, at the second instant when the pistons are approaching, the pressure in the end volumes of the pressure converter oscillator is atmospheric or slightly below. The piston 216 is therefore raised against its upper stop by a spring 222. The volume 217 is connected through the tube 218 to the atmosphere, and the interlock 200 is inactive.

At the time when the pistons of the pressure converter oscillator begin their stroke toward the center, the piston 223 of the relay 202 is in its upper position. When the pressures across the poppet valve 196 become equalized, and the piston 209 moves to central position, the lower volume 212 of the cylinder 198 is connected through a tube 214, lower ports cooperating with the piston 223, and the tube 224, to the reservoir 19. The upper volume 213 of cylinder 198 is connected through a tube 225, and upper ports cooperating with the piston 223, to the atmosphre. The piston 197 is therefore forced upward, abruptly opening the poppet valve 196.

When the poppet valve 196 is closed, the piston 201 is in its lower position. The volume 226 is then connected through a tube 227, lower ports cooperating with the piston 201, and a tube 228, to the reservoir 19. The piston 229 is therefore forced upward, against a spring 230, raising the plunger 231, and allowing the spring 232 to raise the pistons 223 against its upper stop. Upward motion of the plunger 231 is prompt, since the check valve 233 allows free flow of oil between the end volumes of the dashpot 203.

When the poppet valve 196 opens, the piston 201 is moved to its upper position. The volume 226 is then connected through the tube 227, and lower ports cooperating with the piston 201 to atmosphere. The plunger 231 therefore starts to descend under the influence of the spring 230. At first it moves relatively slowly, as oil flows through tubes 234 and 235 and a restriction 236. After an interval, the piston 238 of the dashpot uncovers a port, and oil can flow freely through a tube 237. The plunger 231 then descends abruptly forcing the piston 223 against its lower stop.

The lower volume 212 of cylinder 198 is now connected through a tube 239, and lower ports cooperating with the piston 223, to atmosphere. The upper volume 213 of the cylinder 198 is connected through a tube 225, upper ports cooperating with the piston 223, and a tube 224 to the reservoir 19. The piston 197 is therefore forced downward, and the poppet valve 196 is abruptly closed.

When the poppet valve 196 is closed there is a connection from the tube 167 (see FIG. 11) through upper ports cooperating with the piston 201 to atmosphere. When the poppet valve 196 is open, these ports connect tube 167 through a tube 239 to the reservoir 19. The tube 167 supplies pressure to the interlock of the valve 133 shown in FIG. 11. This interlock therefore prevents the opening of the valve 133 during the time when the valve 135 is open, and is inactive when the valve 135 is closed.

The time interval during which the poppet valve 196 remains open depends upon the resistance of the restriction 236. This restriction is in the form of a needle valve of gradual taper moved by a piston 240 under the control of the dashpot 204. When the piston 240 moves to the right, the passage between the tubes 234 and 235 becomes more restricted, the rate of descent of the plunger 231 is decreased, and the interval during which the valve 196 is open is increased. When the piston 240 moves to the left the opposite effect occurs. End volumes 242 and 243, affecting the piston 240, are connected respectively through tube 244 and 245 to Pitot tubes 246 and 247 located in the pipe 139 (FIG. 11) which is the connection from the reservoir 19 to the valve 133. These Pitot tubes are also shown in FIG. 11.

During normal flow through the pipe 139 the difference of pressure in volumes 242 and 243 produced by these Pitot tubes is small and not sufficient to overcome friction and move the piston 240. However, when valve 133 opens, if there was a substantial pressure across it at the instant of opening, a sudden puff of air flows through the pipe 139 at high velocity. This produces a relatively large momentary pressure difference between the volumes 242 and 243 and moves the piston 240 to alter the resistance of the restriction 236.

The amount of movement, which is very small during any one cycle, is controlled by the resistance of the dashpot 204 as will be described. If the difference in pressure across valve 133, at time of opening, causes a sudden flow in the pipe 139 to the right, because the pressure in the central volume of the pressure converter oscillator at the instant of opening was below that of the reservoir 19, the momentary pressure in the volume 243 will be greater than in the volume 242, and the piston 240 will be moved a short distance to the left, lowering the resistance of the restriction 236. The interval of opening of the valve 135 will thus be shortened. There will be less exhaust in the subsequent cycle through the valve 135 into the reservoir 22, and the pressure built up between the pistons as they approach will be higher than in the previous cycle at the time that the valve 133 again opens. If the sudden flow in the pipe 132, at the time of opening of the valve 133, is to the left, the opposite effect occurs. There is thus present a means for controlling the interval of opening of the valve 135 in such manner as to establish a condition of substantially zero pressure across the valve 133 at the time it opens, and to maintain this condition as load on the pressure converter varies.

Damping is not as necessary on this control as on others that have been described, but it is desirable. It is provided by varying the resistance to movement encountered by the piston 241 of the dashpot 204, and thus the rate of correction corresponding to a given amount of momentary flow through the pipe 139. The end volumes of the dashpot 204 are connected through tubes 248 and 249 and a restriction 250 which is similar in construction to the restriction 236. This restriction 250 is controlled by movement of a piston 251, acting against centering springs 252 and 253. A small chamber 254 is connected through check valves 255 and 256 to the tubes 244 and 245, and is thus raised to the maximum pressure produced at either the Pitot tube 246 or the Pitot tube 247. A small leak thorugh a needle valve 257 allows the pressure in chamber 254 to follow this maximum pressure downward. Another small chamber 258 is connected to the chamber 254 through a needle valve 259. The pressure in the chamber 254 thus follows closely the maximum pressure produced at either Pitot tube, and the pressure in the chamber 258 lags behind this pressure, with an adjustable time lag. The chambers 254 and 258 furnish pressure to the top and bottom volumes affecting the piston 251.

Now suppose the momentary flow through the pipe 139 is steady, that is repeats from cycle to cycle for a brief period. The pressures in the chambers 254 and 258 will be substantially equal, there will be no substantial force on the piston 251, which will remain at central position. Under these conditions, the resistance offered by the restriction 250 is such as to produce an appropriate rate of correction, due to the movement of the piston 240, corresponding to the amount of momentary flow through the pipe 139. Suppose, however, that the momentary flow through the pipe 139 is increasing, from cycle to cycle. It may be in either direction for the purposes of the discussion, since the chamber 254 is symmetrically related to the two Pitot tubes 246 and 247. The pressure in the chamber 254 is now rising. The pressure in the chamber 258, which lags, is lower at any instant than in the chamber 254. The piston 251 thus experiences a force moving it downward from its center position. The resistance of the restriction 250 is thus decreased. The correction produced by the momentary flow through the pipe 139 is hence greater than would have been the case with an equal amount of momentary flow which was steady in amount. The rate of correction is thus relatively greater when momentary flow through the pipe 139 is increasing than when it is steady. Conversely, the rate of correction is relatively less when momentary flow through the pipe 139 is decreasing. This effect is in the proper direction to prevent hunting of the control and produce stable operation.

In the event the valves of the pressure converter do not always function precisely, the pistons 123 and 124 will drift toward or away from each other. To limit the amount of drift, the stem of the piston 240 is extended to a piston 261 operating in an extension cylinder connected on opposite sides of the piston by pipes 262 and 263 to the pipe 206 and to a port (not shown) between the ports 127 and 128. The adjustments are such that drift of the pistons 123 and 124 is toward each other. No correction occurs until the buffer zone between the ports 127 and 128 is entered by the pistons. The previously balanced pressure on opposite sides of the piston 261 is then unbalanced by a rise of pressure in the central buffer zone. This displaces the piston 261 to move the piston 240 and the intervening needle valve so that the valve 196 opens longer on the next exhaust stroke. The pistons 123 and 124 therefore do not approach as closely as before, the correction is no longer effective and the drift toward the center buffer resumes until the next correction.

There is thus produced a form of valve 135 which will open positively at the proper moment to initiate exhaust from the central volume of the pressure converter oscillator to the reservoir 22, which will remain open for an interval and then close positively, and which is so controlled that the interval of opening is varied in such manner as to maintain stably substantially zero pressure across the valve 133 at the time this valve opens.

The pressure converter oscillator may be started as follows. The pistons are first brought to center position by means already described in connection with the power oscillator. The reservoir 19 is supplied with a charge of compressed air, from a reservoir maintained at pressure for use for starting purposes. Then the connections used for bringing the pistons to center are restored to normal position and immediately thereafter a brief pulse of air is delivered to the center volume of the pressure converter oscillator by momentarily opening the valve 133, or opening a special starting valve in a bypass about the valve 133. Oscillation then starts and the controls come into action to adjust conditions for steady operation. In an engine with a pressure converter in the form of an oscillator, both oscillators may be started simultaneously by a single starting mechanism.

The effect of gravity on the pistons of a pressure converter oscillator when used vertically may be counteracted, to cause symmetrical oscillation about the center, by means similar to that described for use in the case of the power oscillator. The pressure in the upper end volume during suction is reduced sufficiently by a restriction to cause an average difference to pressure on the outer faces of the two pistons equal to their combined weight, and this restriction is controlled by the relative length of time that two special auxiliary ports remain uncovered.

The pressure converter oscillator has been described with its center volume utilizing a power intake to compress air in the outer volumes. It may also be constructed with those two functions reversed. It has been described as a device for converting the energy of a greater volume of air at lower pressure. It may also be constructed to perform the reverse function.

I claim:

1. A free piston engine comprising a cylinder, a piston adapted to oscillate in the cylinder, means including at least a pair of control ports spaced apart axially of the cylinder and disposed so that at least one of the control ports is traversed by the piston upon oscillation thereof in the cylinder, and means responsive to a pressure differential sensed across the ports upon passage of the piston over the one control port operable to control the oscillation of the piston.

2. A free piston engine comprising a cylinder, a pair of pistons adapted to oscillate in the cylinder, said pistons being entirely free of restraining mechanical, electrical or hydraulic connections to said cylinder or to structure outside of the cylinder, means including at least a pair of control ports spaced apart axially of the cylinder and disposed so that at least one control port is traversed by at least one of the pistons upon the oscillation thereof in the cylinder, and means responsive to a pressure differential across the control ports by the passage of the one piston over the one control port operable to control the oscillation of the pistons.

3. A free piston engine comprising a cylinder, a pair of pistons adapted to oscillate in the cylinder, said pistons being entirely free of restraining mechanical, electrical or hydraulic connection to the cylinder or to structure outside of the cylinder, means to control the operation of the engine, said control means including at least a pair of control ports spaced apart axially of the cylinder and disposed so that at least one of the ports is traversed by at least one piston during its oscillation to establish a pressure differential across the ports, and pressure responsive means connected to the control ports and to the control means effective to operate the latter responsive to the pressure differential across the former.

4. A free piston engine comprising a cylinder, a pair of pistons adapted to oscillate in the cylinder, and control means for the engine including starting control means, synchronizing control means, full injection control means, and gas valving control means, said control means each including control port means, and each control port means including at least a pair of control ports spaced apart axially of the cylinder and having at least one of the ports at a prearranged location corresponding generally to the location of at least one of the pistons in the cylinder when the particular control is desired, so that the one piston upon passing over the one control port causes the control ports to sense a pressure differential to effect thereby operation of the control means.

5. A free piston engine comprising a cylinder, a pair of pistons adapted to oscillate in the cylinder, said pistons being entirely free of restraining mechanical, electrical or hydraulic connections to said cylinder or to structure outside of the cylinder, control means to start the initial oscillation of the pistons in the cylinder, control means to synchronize the oscillation of the pistons symmetrically of the cylinder, control means for timing and quantity control of fuel injected into the cylinder, control means for opening and closing gas valve means of the engine, and control port means for each control means, each of the control port means including at least a pair of control ports spaced apart axially of the cylinder and disposed so that at least one of the ports is at a prearranged location corresponding generally to the location in the cylinder of at least one of the pistons when the particular operation of the control means is desired and upon the one piston passing over the one control port to cause the respective control port means to sense a pressure differential to effect control thereby of each control means.

6. A free piston engine comprising a cylinder, a pair of pistons adapted to oscillate in the cylinder, said pistons being entirely free of restraining mechanical, electrical or hydraulic connections to said cylinder or to structure outside of the cylinder, control means to start the initial oscillation of the pistons in the cylinder, control means for timing and quantity control of fuel injected into the cylinder, control means for opening and closing gas valve means of the engine, and control port means for each of the control means, each control port means including at least a pair of control ports spaced apart axially of the cylinder and disposed so that at least one port of each control port means is at a prearranged location corresponding generally to the location in the cylinder of at least one piston of the pair when the particular operation of the control means is desired and upon the one piston passing over the one control port to cause the respective control port means to sense a pressure differential to effect thereby control of each control means.

7. A free piston engine comprising a cylinder, a pair of pistons adapted to oscillate in the cylinder, said pistons being entirely free of restraining mechanical, electrical or hydraulic connections to said cylinder or to structure outside of the cylinder, control means to synchronize oscillation of the pistons symmetrically of the cylinder, control means for timing and quantity control of fuel injected into the cylinder, control means for opening and closing gas valve means of the engine, control port means for each of the control means and each including at least a pair of control ports spaced apart axially of the cylinder and disposed so that at least one port of the control port means is at a prearranged location corresponding generally to the location of at least one of the pistons in the cylinder when the particular control is desired, effective upon the one piston passing over the one control port to cause the control port means to sense a pressure differential, and pressure responsive means to operate each control means upon the established pressure differential across the respective control port means.

8. A free piston engine comprising a cylinder, a pair of piston adapted to oscillate in the cylinder, said pistons being entirely free of restraining mechanical, electrical or hydraulic connections to said cylinder or to structure outside of the cylinder, control means for timing and quantity control of fuel injected into the cylinder, control means for opening and closing gas valves of the engine, control port means for each control means, each control port means including at least a pair of control ports spaced apart axially of the cylinder and disposed so that at least one port of each control port means is at a prearranged location corresponding generally to the location in the cylinder of at least one piston of the pair when the particular control is desired, effective upon the one piston passing over the one control port to cause the respective control port means to sense a pressure differential, and pressure responsive means to operate each control means upon the established pressure differential across the respective control port means.

9. A free piston engine comprising a cylinder, a pair of pistons adapted to oscillate in the cylinder, said pistons being entirely free of restraining mechanical, electrical or hydraulic connections to said cylinder or to structure outside of the cylinder, control means to synchronize oscillation of the pistons in the cylinder, control means for timing and quantity control of fuel injected into the cylinder, control port means for each control means, each control port means including at least a pair of control ports spaced apart axially of the cylinder and disposed so that at least one port of each control port means is at a prearranged location corresponding generally to the location in the cylinder of at least one piston of the pair when the particular control is desired, effective upon the one piston passing over the one control port to cause the respective control port means to sense a pressure differential, and pressure responsive means to operate each control means upon the established pressure differential across the respective control port means.

10. A free piston engine comprising a cylinder, a pair of pistons adapted to oscillate in the cylinder, said pistons being entirely free of restraining mechanical, electrical or hydraulic connections to said cylinder or to structure outside of the cylinder, control means to synchronize oscillation of the pistons symmetrically of the cylinder, control means for opening and closing gas valve means of the engine, control port means for each control means, each control port means including at least a pair of control ports spaced apart axially of the cylinder and disposed so that at least one of the ports is at a prearranged location corresponding generally to the location of the pistons in the cylinder when the particular control is desired, effective upon the one piston passing over the one control port to cause the control port means to sense a pressure differential, and pressure responsive means to operate each control means upon the established pressure differential across the respective control port means.

11. A free piston engine comprising a cylinder disposed on a vertical axis, a pair of pistons adapted to oscillate in the cylinder, means to maintain the pistons at all times separated a limited distance, and control means to start the initial oscillation of the pistons in the cylinder, said control means including first, second and third control ports spaced apart axially of the cylinder at predetermined locations, the first and second control ports being open, respectively, substantially to the center of the cylinder and to the lower end of the cylinder below the pistons, and the third control port being spaced from the center of the cylinder so as to be passed by one of the pistons when the space between the pistons is substantially at the center of the cylinder, a source of air contained under high pressure, and means including first and second valve means to communicate the source of air with the first and second control ports, so that the second valve means can be opened to admit air to the lower end of the cylinder to raise the pistons until the one piston passes over the third control port and thereafter can be closed and substantially simultaneously therewith the first valve means can be opened momentarily to admit a pulse of high pressure air between the pistons to drive them apart.

12. A free piston engine comprising a cylinder disposed on a vertical longitudinal axis, upper and lower pistons adapted to oscillate in the cylinder, said pistons being entirely free of restraining mechanical, electrical or hydraulic connections to said cylinder or to structure outside of the cylinder, means to maintain the pistons at all times separated a limited distance, and control means to start the initial oscillation of the pistons in the cylinder, said control means including first, second and third control ports spaced apart axially of the cylinder, the first control port being located substantially at the center of the cylinder, the second control port being spaced below the center of the cylinder a distance slightly less than the length of the lower piston, and the third control port being open to the lower end of the cylinder below the lower piston, a source of air contained under high pressure, means including first valve means to communicate the source of air with the first control port, means including second valve means communicating the source of air with the third control port, means to open the second valve means to admit air to the lower end of the cylinder below the lower piston to raise the pistons until the lower piston passes over the second control port, and means with the pistons at this location in the cylinders to close the second valve means and substantially simultaneously therewith to open the first valve means momentarily to admit a pulse of high pressure air to the cylinder between the pistons to drive the pistons apart.

13. A free piston engine comprising a cylinder, a pair of pistons adapted to oscillate in the cylinder and to define spaced gas chambers between the opposite ends of the pistons and the ends of the cylinder, air intake means to each of the chambers, and control means to synchronize oscillation of the pistons symmetrically of the cylinder, said control means including a pair of control ports spaced apart axially of the cylinder substantially symmetrically of the center thereof adapted to be traversed by the pistons during their oscillations, variable resistance valve means on at least one of the air intake means, and pressure responsive means connected to the valve means responsive to the unsimultaneous passage of the pistons over the control ports to operate the valve means to increase the flow resistance of the air intake means to the chamber associated with the leading piston relative to that of the lagging piston.

14. A free piston engine comprising a cylinder, a pair of pistons adapted to oscillate in the cylinder and to define spaced compression chambers between the opposite ends of the pistons and the ends of the cylinder, said pistons being entirely free of restraining mechanical, electrical or hydraulic connections to the cylinder or to structure outside of the cylinder, air intake means to each of the chambers, and control means to synchronize oscillation of the pistons symmetrically of the cylinder, said control means including a pair of control ports spaced apart axially of the cylinder at predetermined symmetrical locations to be traversed by the pistons during oscillations thereof, variable resistance valve means on at least one of the air intake means, and pressure responsive means connected to the valve means responsive to the unsimultaneous passage of the pistons over the control ports to operate the valve means to increase the flow resistance of the air intake means to the chamber associated with the leading piston relative to that of the lagging pistons.

15. A free piston engine comprising a cylinder, a pair of pistons adapted to oscillate in the cylinder, and control means to supply fuel to the engine, said control means including a plurality of control ports spaced apart axially of the cylinder and disposed at predetermined positions therein, so that at least one group of the ports are traversed by at least one of the pistons during oscillation thereof in the cylinder at locations corresponding generally to the locations in the cylinder at which fuel supply to the engine is desired, first pressure responsive means connected to the fuel supply means and to some including the one group of the control ports operable to actuate the former responsive to pressure differential established across the latter upon the passage of the piston over the ports, and second pressure responsive means connected to the fuel supply means and to other control ports operable to vary the quantity of fuel discharged from the fuel supply means responsive to and inversely proportional to the maximum pressures sensed by the other control ports.

16. A free piston engine comprising a cylinder, a pair of pistons adapted to oscillate in the cylinder, said piston being entirely free of restraining mechanical, electrical or hydraulic connections to said cylinder or to structure outside of the cylinder, and control means to supply fuel to the engine, said control means including first and second control ports spaced apart axially of the cylinder substantially symmetrically of the center thereof and closely adjacent thereto, means including a third control port axially spaced from the first control port endwardly thereof a distance coresponding generally to the length of the adjacent piston, so that the piston substantially simultaneously covers and uncovers the first and third control ports upon oscillation thereof in the cylinder to affect a pressure differential across the ports, and pressure responsive means connected to the fuel supply means and to the control ports operable to actuate the former responsive to the pressure differential of the latter.

17. A free piston engine comprising a cylinder, a pair of pistons adapted to oscillate in the cylinder, said piston being entirely free of restraining mechanical, electrical or hydraulic connections to said cylinder or to structure outside of the cylinder, and control means to supply fuel to the engine, said control means including first and second control ports spaced apart axially of the cylinder substantially symmetrically of the center thereof and closely adjacent thereto, means including a third control support axially spaced from the first control port endwardly thereof a distance corresponding generally to the length of the adjacent piston, so that the piston substantially simultaneously covers and uncovers the first and third control ports upon oscillation thereof in the cylinder to affect a pressure differential across the ports, pressure responsive means connected to the fuel supply means and to the first, second and third control ports operable to actuate the former responsive to the pressure differential across the latter, means including a fourth control port located proximate one end of the cylinder, and a second pressure responsive means connected to the fuel supply means operable to vary the quantity of fuel discharged therefrom responsive to and inversely proportional to the maximum pressures sensed by the fourth control port.

18. A free piston engine comprising a cylinder, a pair of pistons adapted to oscillate in the cylinder, gas valve means for the engine, and control means for opening and closing the gas valve means, said control means including a plurality of control ports spaced apart axially of the cylinder at predetermined positions relative to the locations therein of the pistons for the desired control of the gas valve means, and pressure responsive means communicating with the control ports effective to actuate the gas valve means upon pressure differential created by passage of at least one of the pistons over at least a pair of the ports.

19. A free piston engine comprising a cylinder, a pair of pistons adapted to oscillate in the cylinder, said pistons being entirely free of restraining mechanical, electrical or hydraulic connections to said cylinder or to structure outside of the cylinder, gas valve means for the engine, and control means for opening and closing the gas valve means, said control means including first, second and third control ports spaced apart axially of the cylinder, the first control port being positioned proximate the gas valve opening to be traversed by one of the pistons upon oscillation thereof in the cylinder, the second control port being spaced from the first control port toward the adjacent end a distance slightly less than the length of the one piston, and the third control port being spaced from and intermediate the first and second control ports, and pressure responsive means communicating respectively, with the first and third, and with the second control ports effective to actuate the gas valve means upon pressure differential created by passage of the one piston over the respective ports.

20. A free piston engine comprising a cylinder, a pair of pistons adapted to oscillate in the cylinder, said pistons being entirely free of restraining mechanical, electrical or hydraulic connections to said cylinder or to structure outside of the cylinder, gas valve means for the engine, and control means for opening and closing the gas valve means, said control means including first, second and third control ports spaced apart axially of the cylinder, the first control port being positioned proximate the gas valve opening of the engine to be traversed by one of the pistons upon oscillation thereof in the cylinder, the second control port being spaced from the first control port toward the adjacent end of the cylinder a distance slightly less than the length of the one piston, and the third control port being spaced from and intermediate the first and second control ports, pressure responsive means communicating on opposite sides respectively, with the first and third, and with the second control ports effective to actuate the gas valve means upon pressure differential created by passage of the one piston over the respective ports, and means including a one way restriction means to maintain the valve means opened at least a limited time.

(References on following page)

References Cited in the file of this patent

UNITED STATES PATENTS

| | | |
|---|---|---|
| 1,089,892 | Zoelly | Mar. 10, 1914 |
| 1,291,458 | Fessenden | Jan. 14, 1919 |
| 1,343,536 | Weeks | June 15, 1920 |
| 1,620,565 | McKewon | Mar. 8, 1927 |
| 1,858,102 | McKewon | May 10, 1932 |
| 1,930,786 | Witkiewicz et al. | Oct. 17, 1933 |
| 2,083,680 | Anderson et al. | June 15, 1937 |
| 2,246,701 | Steiner | June 24, 1941 |
| 2,344,058 | Pescara | Mar. 14, 1944 |
| 2,355,177 | Pescara | Aug. 8, 1944 |
| 2,414,745 | Kalitinsky | Jan. 21, 1947 |
| 2,425,850 | Welsh | Aug. 19, 1947 |
| 2,469,739 | Meitzler | May 10, 1949 |
| 2,470,231 | Beale | May 17, 1949 |
| 2,473,204 | Huber | June 14, 1949 |
| 2,581,600 | Pescara | Jan. 8, 1952 |
| 2,600,251 | Lewis et al. | June 10, 1952 |
| 2,807,136 | Foster | Sept. 24, 1957 |

FOREIGN PATENTS

| | | |
|---|---|---|
| 218,708 | Switzerland | Dec. 31, 1941 |
| 304,954 | Italy | July 23, 1933 |
| 467,423 | Great Britain | June 16, 1937 |
| 502,758 | Great Britain | Mar. 24, 1939 |
| 814,540 | Germany | Jan. 24, 1952 |